United States Patent
Dao et al.

(10) Patent No.: US 11,582,313 B2
(45) Date of Patent: Feb. 14, 2023

(54) OPTIMIZING USER EQUIPMENT OPERATION BY CONDITIONING MULTIPLE POLICIES ON INFORMATION ELEMENTS

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 13 days.

(21) Appl. No.: 16/859,221

(22) Filed: Apr. 27, 2020

(65) Prior Publication Data
US 2020/0259904 A1    Aug. 13, 2020

Related U.S. Application Data

(63) Continuation of application No. 16/443,450, filed on Jun. 17, 2019.

(60) Provisional application No. 62/688,996, filed on Jun. 22, 2018.

(51) Int. Cl.
*H04W 40/02* (2009.01)
*H04L 29/08* (2006.01)
*H04L 67/14* (2022.01)

(52) U.S. Cl.
CPC ............ *H04L 67/14* (2013.01); *H04W 40/02* (2013.01)

(58) Field of Classification Search
None
See application file for complete search history.

(56) References Cited

U.S. PATENT DOCUMENTS

| | | |
|---|---|---|
| 2018/0262924 A1 | 9/2018 | Dao et al. |
| 2019/0200264 A1 | 6/2019 | Kim et al. |
| 2019/0373441 A1 | 12/2019 | Ryu et al. |
| 2019/0394833 A1* | 12/2019 | Talebi Fard ......... H04W 60/00 |
| 2021/0168584 A1* | 6/2021 | Li ......................... H04W 28/16 |
| 2021/0168695 A1* | 6/2021 | Ryu ........................ H04W 8/14 |
| 2021/0211938 A1 | 7/2021 | Shen |

FOREIGN PATENT DOCUMENTS

| | | |
|---|---|---|
| WO | 2014187477 A1 | 11/2014 |
| WO | 2017220158 A1 | 12/2017 |
| WO | 2018070436 A1 | 4/2018 |

OTHER PUBLICATIONS

"System Architecture for the 5G System; Stage 2"; 3GPP TS 23.501 V15.2.0 (Jun. 2018).

(Continued)

*Primary Examiner* — Hong Shao

(57) ABSTRACT

A method and system for protocol data unit (PDU) session release due to violation of time or location information element constraints is provided. Operations may be part of optimizing operation of a user equipment (UE) in a wireless communications network. A policy control function (PCF) determines whether there is a violation of at least one of location information and time information associated with a background data transfer. Upon detecting such a violation, the PCF requests a session management function (SMF) to release a PDU session associated with the background data transfer. The SMF responds by releasing the PDU session.

20 Claims, 5 Drawing Sheets

(56) References Cited

OTHER PUBLICATIONS

"Procedures for the 5G System; Stage 2"; 3GPP TS 23.502 V15.2.0 (Jun. 2018).
"Policy and Charging Control Framework for the 5G System; Stage 2"; 3GPP TS 23.503 V15.2.0 (Jun. 2018).
KDDI, Toyota ITC, Proposal of UE Policy for Background Data Transfer, 3GPP TSG-SA WG2 Meeting #127, Sanya, P.R. China, Apr. 16-20, 2018, S2-183520, 4 pages.
3GPP TR 23.791 V0.2.0 (Mar. 2018), 3rd Generation Partnership Project; Technical Specification Group Services and System Aspects; Study of Enablers for Network Automation for 5G; (Release 16), 13 pages.
3GPP TS 23.502 V15.1.0 (Mar. 2018), 3rd Generation Partnership Project; Technical Specification Group Services and System Aspects; Proceduresfor the 5G System; Stage 2 (Release 15), 285 pages.

\* cited by examiner

US 11,582,313 B2

OPTIMIZING USER EQUIPMENT OPERATION BY CONDITIONING MULTIPLE POLICIES ON INFORMATION ELEMENTS

CROSS REFERENCE TO RELATED APPLICATIONS

This application is a continuation of U.S. application Ser. No. 16/443,450 filed Jun. 17, 2019 and claims the benefit of and priority to U.S. Provisional Application Ser. No. 62/688,996 filed Jun. 22, 2018, the contents of which are hereby incorporated by reference.

TECHNICAL FIELD

The present disclosure relates to wireless communications and particular embodiments or aspects relate to optimizing operation of user equipment in wireless communication networks in accordance therewith.

BACKGROUND

Network slicing is a capability intended to bring network resource utilization efficiency, deployment flexibility and support fast growing over-the-top (OTT) applications and services. The Third Generation Partnership Project (3GPP) is incurring considerable effort to develop comprehensive network slice-related standards in various working groups, including without limitation, the SA2 (architecture) working group, which is responsible for overall system architecture. The 3GPP SA2 Working Group is working on specification of the 5G Core (5GC) architecture, including network slicing as a feature. Its Technical Specification (TS) TS-503 defines the Policy and Charging Control Framework for the 5G System.

One mechanism that is being proposed in support of the Policy and Charging Control Framework is a Network Data Analytics function (NWDAF), such as is discussed in U.S. patent application Ser. No. 15/898,444 filed Feb. 17, 2018 by DAO, Ngoc Dung et al. and entitled "System and Method of Network Policy Optimization", which is incorporated by reference in its entirety herein. The NWDAF is proposed for use to optimize the operation of 5G networks such as traffic routing, mobility management, interaction with control plane (CP) functions (CPFs) including without limitation, the session management function (SMF) 92 (FIG. 2), the policy and control function (PCF) 201 (FIG. 2), the access and mobility management function (AMF) 90 (FIG. 2), the network repository function (NRF) 98 (FIG. 2) and/or operation, administration and maintenance (OAM) functions and/or third party functions. However, this mechanism does not completely address how operation of a user equipment (UE) 52 (FIG. 1) may be impacted.

The PCF 201 may manage and/or optimize one or more policies that govern UE operation, including without limitation, a policy that allows the UE 52 to select one or multiple routes over which to send and/or receive data, including without limitation, a UE route selection policy (URSP), a policy that allows the UE 52 to discover and/or select an appropriate access network (AN), including without limitation, an access network discovery & selection policy (ANDSP), a policy that allows the UE 52 to send a large amount of data to an application server (AS) in the data network 88 (DN), including without limitation, a UE background data transfer policy (UBDTP), a policy that allows the UE 52 to select one or more specific routes over which to send data of multiple quality of service (QoS) flows of a common protocol data unit (PDU) session and/or data of a QoS flow to the AS, including without limitation, an access traffic steering, switching and splitting (ATSSS) policy, a quality of service (QoS) policy that allows the UE 52 to send and/or receive data packets with predefined QoS parameters and/or a policy that allows the UE 52 to send and/or receive data with a specific charging rate and/or consumption limit, including without limitation, a spending policy.

The URSP may govern how a UE 52 to determine how to route outgoing traffic, such as, without limitation, by establishing a new PDU session, routing to an established PDU session, off-loading to a non-3GPP AN outside a PDU session and/or to select a network slice identified by one or more single network slice selection assistance information (S-NSSAI, collectively NSSAI).

The ANDSP may govern how a UE 52 to select non-3GPP ANs and/or decide how to route traffic between a selected 3GPP AN and a non-3GPP AN.

The UBDTP is intended to govern how a UE 52 may send background data gathered by the UE to an AS. Background data is data that is sent to the AS but has little or no urgency, so that the background data is not necessarily sent immediately. On the other hand, the volume of background data could potentially be very large One non-limiting example of background data is in the context of vehicle to network (V2X) UEs 52. Such V2X UEs 52 may collect sensor data for fault diagnostics and/or vehicle-mounted camera photos of road conditions that may be used to build a 2D or 3D map of the roads.

The UBDTP is based on the proposition that the background data may be sent by the UE 52 when the network load is low.

Conventionally, an application function (AF) 104 (FIG. 3) may negotiate with the network to identify a time window and a location during which background data may be transferred. In such an approach, the AF 104 may use a proprietary solution to send the time window to the UE 52. Such a solution may involve a considerable signaling and network load to convey this information to the UE 52.

Alternatively, it has been proposed that the network could interact directly with the UE 52 in order to communicate the UBDTP to the UE 52. Such a proposal is promising but lacks information on mechanisms that govern how the UE 52 would select a network slice, and/or radio access technology (RAT), and/or access network (AN) and what packet filter would be used for QoS support. Further, at present, there is no method that allows the mobile network to enforce the UBDTP.

The ATSSS policy governs how a UE 52 can use multiple ANs to establish a PDU session. The AN may be a non-3GPP AN such as, without limitation, a Wi-Fi AN or a fixed AN and/or a 3GPP AN such as, without limitation, a 4G and/or 5G radio AN (RAN or (R)AN) 84 (FIG. 2). When a PDU session is allowed to send PDUs across multiple ANs, a packet handling entity in a UE 52 could select a specific AN to send uplink (UL) packets of one or a multiple of QoS flows. In some examples, the packet handling entity could send a certain percentage of packets to one AN and another percentage of packets to another AN.

The QoS policy may comprise one or more QoS flows and supports QoS flows that involve a guaranteed flow bit rate (GBR), those that do not involve a GBR and/or reflective QoS. A QoS flow represents the finest granularity of QoS differentiation within a PDU session and is associated with a QoS flow identifier (QFI). User plane (UP) 106 traffic having a common QFI within a PDU session receives the same traffic forwarding (including without limitation, scheduling and/or admission threshold) treatment, which is understood and named as service.

A QoS flow is characterized by three elements, namely:
a QoS profile provided by an SMF 92 to the AN 84 via the AMF 90;
one or more QoS rules provided by the SMF 92 to the UE 52 via the AMF 90 and/or derived by the UE 52 using reflective QoS control; and
information enabling classification, bandwidth enforcement and marking of UP traffic conveyed by the SMF 92 to a UP function (UPF) 86 (FIG. 3), including without limitation:
one or more UL packet detection rules (PDRs) provided by the SMF 92 containing a UL packet filter set of the service data flow (SDF) template,
one or more downlink (DL) PDRs containing the DL packet filter set of the SDF template and/or a reflective QoS indication,
a PDR precedence value for each UL and/or DL PDR that may, in some examples be set to a precedence value of a policy and charging control (PCC) rule;
QoS-related rules, and
corresponding packet marking information, including without limitation, the QFI and/or a transport level packet marking value, which may in some examples be a differentiated services code point (DSCP) value of an outer IP header.

In 5G networks, a (typically non-GBR) QoS flow associated with a default QoS rule is established for a PDU session and remains established throughout the lifetime of the PDU session to provide connectivity to the UE 52.

Accordingly, there may be a need for mechanisms to optimize operation of a UE 52 in wireless communication networks, including without limitation, in a background data transfer policy, that is not subject to one or more limitations of the prior art.

This background is intended to provide information that may be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed a method for optimizing operation of a UE in a wireless communications network, comprising actions at an NF of the network of: transmitting along the network at least one rule of at least one policy that governs how the UE may exchange packets along the network and that contains information conditioned on at least one information element, such that: if the information conditioned on the at least one is contained in the at least one rule and the UE does not satisfy the information contained in the at least one rule, the UE may be precluded from exchanging packets in accordance with the at least one rule; if the information conditioned on the at least one information element is contained in the at least one rule and the UE satisfies the information contained in the at least one rule, the UE may exchange packets in accordance with any constraints contained in the at least one rule; and if there is no information in the at least one rule corresponding to the at least one information element, the UE may exchange packets in accordance with any constraints contained in the at least one rule.

In an embodiment, the at least one information element can comprise a location element. In an embodiment, the location element can comprise at least one of a geographical location specified by a 2D and/or a 3D coordinate system, a geographical location specified by an identifier of a geographical zone of a mapping system, a RAN address, a cell identifier, a TAI, a registration area identifier and/or an indication that the at least one rule may always be considered.

In an embodiment, the at least one information can comprise a time element. In an embodiment, the time element can comprise at least one of a time of day, a date, a day of week, a day of month, a month, a year, a period specifying at least one of these to start the period and/or at least one of these to end the period, a recurrence and/or an indication that the at least one rule may always be considered.

In an embodiment, the at least one policy can comprise at least one of a URSP, an ANDSP, a UBDTP, an ATSSS policy, a QoS policy an access and mobility management policy and/or a spending policy.

In an embodiment, the at least one information element can be contained in at least one of the URSP rule itself and/or a component of a route selection descriptor of the URSP rule and the component can comprise at least one of a SSC mode, a network slice selection, a DNN selection, a non-seamless off-load indication and/or an access type preference.

In an embodiment, the UBDTP policy can specify at least one of a UBDTP identification phase for identifying whether the at least one UE is entitled to UBDTP service; a UBDTP rules definition phase for defining at least one rule that contains information conditioned on the at least one information element and the at least one rule can comprise at least one of a UBDTP rule and/or a URSP rule; a UBDTP AS configuration phase for identifying the AS associated with the at least one UE receiving UBDTP service; and/or a UBDTP operation phase for providing UBDTP service to background data transferred by the at least one UE to the AS associated therewith in accordance with the at least one rule defined in the UBDTP definition phase.

In an embodiment, the QoS policy can comprise at least one of a QoS profile of a QoS flow for exchange between an SMF and a RAN node conditioned on the at least one information element, a QoS rule for exchange between the SMF and the at least one UE conditioned on the at least one information element and/or at least one QoS-related information set for exchange between the SMF and a UPF conditioned on the at least one information element.

In an embodiment, the access and mobility management policy can comprise at least one TAI for exchange between the NF and an operator through an AMF conditioned on the at least one information element.

In an embodiment, the NF can comprise a PCF.

In an embodiment, the method can further comprise the action of including at least one indication that stipulates whether the at least one rule will be strictly enforced. In an embodiment, if the indication stipulates that the at least one rule will be strictly enforced, if the UE does not satisfy the information contained in the at least one rule, the UE is precluded from exchanging packets in accordance with the at least one rule. In an embodiment, if the indication stipulates that the at least one rule will not be strictly enforced, even if the UE does not satisfy the information contained in the at least one rule, the UE may exchange packets in accordance with any constraints contained in the at least one rule. In an embodiment, if the at least one rule is considered, a different criterion can be applied to packets exchanged in accordance with the at least one rule. In an embodiment, the different criterion can be at least one of a different charging rate and/or a different QoS.

According to a second aspect of the present disclosure, there is disclosed an NF of a wireless communications network comprising: a processor; and a non-transient memory for storing instructions that when executed by the processor cause the NF to optimize operation of a UE in the network, by: transmitting along the network at least one rule of at least one policy that governs how the UE may exchange packets along the network and that contains information conditioned on at least one information element, such that: if the information conditioned on the at least one information element is contained in the at least one rule and the UE does not satisfy the information contained in the at least one rule, the UE may be precluded from exchanging packets in accordance with the at least one rule; if the information conditioned on the at least one information element is contained in the at least one rule and the UE satisfies the information contained in the at least one rule, the UE may exchange packets in accordance with any constraints contained in the at least one rule; and if there is no information in the at least one rule corresponding to the at least one information element, the UE may exchange packets in accordance with any constraints contained in the at least one rule.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

According to another broad aspect of the invention, a method for optimizing operation of a user equipment (UE) in a wireless communications network is provided. The method, performed at a network function (NF), comprises: transmitting along the network at least one rule of at least one policy that governs how the UE exchanges packets along the network and that contains information conditioned on at least one information element, such that: if the information conditioned on the at least one information element is contained in the at least one rule and the UE does not satisfy the information contained in the at least one rule, the UE is precluded from exchanging packets in accordance with the at least one rule; if the information conditioned on the at least one information element is contained in the at least one rule and the UE satisfies the information contained in the at least one rule, the UE exchanges packets in accordance with any constraints contained in the at least one rule; and if there is no information in the at least one rule corresponding to the at least one information element, the UE exchanges packets in accordance with any constraints contained in the at least one rule.

In one aspect, at least one information element comprises a location element.

In another aspect, the location element comprises at least one of a geographical location specified by a 2D and/or a 3D coordinate system, a geographical location specified by an identifier of a geographical zone of a mapping system, a RAN address, a cell identifier, a tracking area identifier (TAI), a registration area identifier and/or an indication that the at least one rule is always considered.

In one aspect, the at least one information element comprises a time element.

In one embodiment, the time element comprises at least one of a time of day, a date, a day of week, a day of month, a month, a year, a period specifying at least one of these to start the period and/or at least one of these to end the period, a recurrence and/or an indication that the at least one rule is always considered.

In another embodiment, the at least one policy comprises at least one of a UE route selection policy (URSP), an access network discovery & selection policy (ANDSP), a UE background data transfer policy (UBDTP), an access traffic steering, switching and splitting (ATSSS) policy, a quality of service (QoS) policy, an access and mobility management policy and a spending policy.

In one embodiment, the URSP comprises a list of route selection descriptors, each route selection descriptor including a route selection descriptor precedence value that determines the priority of the route selection descriptor, and one or more of location information element and time information element that respectively determine a location(s) and a time period to apply the route selection descriptor.

In another embodiment, the at least one information element is contained in at least one of the URSP rule and a component of a route selection descriptor of the URSP rule, the component comprising at least one of a session continuity (SSC) mode, a network slice selection, a data network name (DNN) selection, and a non-seamless off-load indication and/or an access type preference.

In another embodiment, the UBDTP policy specifies at least one of a UBDTP identification phase for identifying whether the at least one UE is entitled to UBDTP service; a UBDTP rules definition phase for defining at least one rule that contains information conditioned on the at least one information element, the at least one rule comprising at least one of a UBDTP rule and a URSP rule; and a UBDTP application server (AS) configuration phase for identifying the AS associated with the at least one UE receiving UBDTP service; and a UBDTP operation phase for providing UBDTP service to background data transferred by the at least one UE to the AS associated therewith in accordance with the at least one rule defined in the UBDTP rules definition phase.

In another embodiment, the QoS policy comprises at least one of a QoS profile of a QoS flow for exchange between a session management function (SMF) and a radio access network (RAN) node conditioned on the at least one information element, and a QoS rule for exchange between the SMF and the at least one UE conditioned on the at least one information element and at least one QoS-related information set for exchange between the SMF and a user plane (UP) function (UPF) conditioned on the at least one information element.

In another embodiment, the access and mobility management policy comprises at least one tracking area identifier (TAI) for exchange between the NF and an operator through an access and mobility management function (AMF) conditioned on the at least one information element.

In another embodiment, the NF comprises a policy and control function (PCF).

In another embodiment, the at least one policy comprises at least one of a UE route selection policy (USRP) and the PCF creates the URSP usable for background data transfer.

In another embodiment, the PCF sends to a session management function (SMF) of the network, a set of policy charging and control (PCC) rules that include information on handling a UE background data transfer service associated with a PDU session. The PCC rules include at least one of a time information element and a location information element.

In another embodiment, if at least one of the PCF and a unified data management (UDM) indicate that the UE is entitled to use background data transfer service, and at least one of the UBDTP and URSP includes at least one of a location information element and a time information element that is not satisfied, the SMF rejects a UE request.

In another embodiment, if UE configuration data indicate that the UE is entitled to use background data transfer service, but at least one of the PCF and UDM confirm that at least one of a location information element and a time information element is not satisfied, at least one of the PCF and the UDM sends a response to the SMF indicating a rejection indication to a SMF request for data association dedicated to PDU session establishment being requested by the UE.

In another embodiment, if UE configuration data indicates that the UE is entitled to use background data transfer service, and at least one of the PCF and UDM confirm that both location information element and time information element are satisfied, at least one of the PCF and the UDM sends a response to the SMF indicating an acceptance indication to a SMF request for data association dedicated to PDU session establishment being requested by the UE.

In another embodiment, the SMF rejects the UE request by sending a reject message to the UE via an application management function (AMF) of the network, the reject message including a cause that indicates at least one reason for rejecting the UE request.

In another embodiment, the at least one reason includes at least one of: the UE is not entitled to background data transfer service, a current UE location does not satisfy a location information element constraint, and a current UE time does not satisfy a time information element constraint.

In another embodiment, the UE is entitled to UBDTP service, the SMF establishes a requested PDU session for transfer of background data.

In another embodiment, the SMF checks at least one of the location information element and the time information element for the PDU session to determine if the UE is entitled to the use a PDU session for transferring background data.

In another embodiment, if the UE is not entitled to use the background data transfer service, or if the UE is entitled to use the background data transfer service but at least one of the location information element and the time information element constraints is not satisfied, the SMF sends a reject message to the AMF that includes a cause indicating at least one reason that the UE is not entitled to establish a PDU session or activate user plane of an existing PDU session for transferring the background data.

In another embodiment, if the UE is entitled to the UBDTP service, and the location and time information element constraints are satisfied, at least one of the SMF and the PCF monitor the location and time information elements for the duration of the PDU session of the background data transfer.

In another embodiment, based on the monitoring, the SMF determines that at least one of the location information element and the time information element is not satisfied, the SMF initiates a PDU session release procedure.

In another embodiment, based on the monitoring, the SMF determines that at least one of the location information element and the time information element is not satisfied, the SMF initiates a user plane (UP) deactivation of a UP connection of an existing PDU session.

In another embodiment, the SMF initiates the PDU session release procedure upon a request of the PCF due to a violation of the at least one of the time and location information element constraints.

In another embodiment, the at least one of the location information element and the time information element constraints is not satisfied as a result of a UE mobility and handover transition.

In another embodiment, the method further comprises including at least one indication that stipulates whether the at least one rule is strictly enforced.

In another embodiment, the network includes an application function (AF) that specifies at least one of network area information and time window information, the AF includes the at least one indication as to whether the at least one of network area information and time window information will be strictly enforced.

In another embodiment, if the indication stipulates that the at least one rule will be strictly enforced, if the UE does not satisfy the information contained in the at least one rule, then the UE is precluded from exchanging packets in accordance with the at least one rule.

In another embodiment, if the indication stipulates that the at least one rule will not be strictly enforced, even if the UE does not satisfy the information contained in the at least rule, the UE exchanges packets in accordance with any constraints contained in the at least one rule.

In another embodiment, the PCF sends a UE route selection policy (USRP) when a condition pertaining to at least one of a time period and a location is met.

In another embodiment, when the condition pertaining to at least one of a time information element and a location information element is met, the UE performs one of establishing a PDU session and activating a UP connection of an existing PDU session to couple to a data network name (DNN) selection for use of network services provided therein.

In another embodiment, if the UE exchanges packets even though the UE does not satisfy the information in the at least one rule, a different criterion is applied to packets exchanged in accordance with the at least one rule.

In another embodiment, the criterion is at least one of a different charging rate and a different quality of service (QoS).

In yet another broad aspect of the invention, a network function (NF) of a wireless communications network is provided. The NF comprises a processor; and a non-transient memory for storing instructions that when executed by the processor cause the NF to optimize operation of a user equipment (UE) in the network, by: transmitting along the network at least one rule of at least one policy that governs how the UE exchanges packets along the network and that contains information conditioned on at least one information element, such that: if the information conditioned on the at least one information element is contained in the at least one rule and the UE does not satisfy the information contained in the at least one rule, the UE is be precluded from exchanging packets in accordance with the at least one rule; if the information conditioned on the at least one information element is contained in the at least one rule and the UE satisfies the information contained in the at least one rule, the UE exchanges packets in accordance with any constraints contained in the at least one rule; and if there is no information in the at least one rule corresponding to the at least one information element, the UE exchanges packets in accordance with any constraints contained in the at least one rule. A system including the NF is also provided.

Some aspects and embodiments of the present disclosure may provide a method of optimizing UE operation by conditioning multiple policies on one or more information elements.

BRIEF DESCRIPTION OF THE DRAWINGS

Examples of the present disclosure will now be described by reference to the following figures, in which identical reference numerals in different figures indicate identical elements and in which.

Figure 1:
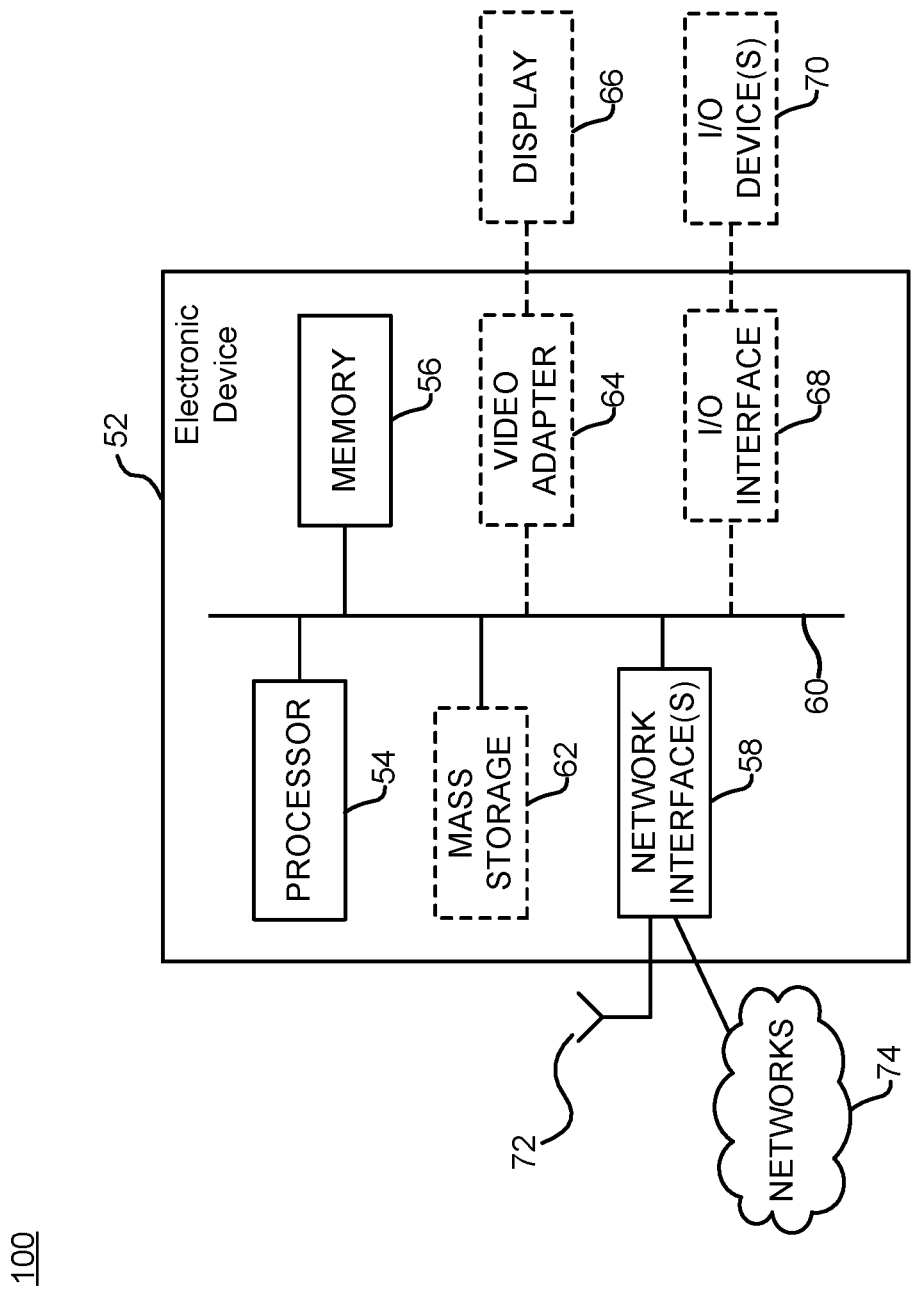
FIG. 1 is a block diagram of an electronic device within a computing and communications environment that may be used for implementing devices and methods in accordance with representative examples of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the examples of the present disclosure, so as not to obscure the disclosure with details that will be readily apparent to those of ordinary skill in the art having the benefit of the description herein.

Any feature or action shown in dashed outline may in some example examples be considered as optional.

DESCRIPTION

FIG. 1 is a block diagram of an electronic device (ED) 52 illustrated within a computing and communications environment 100 that may be used for implementing the devices and methods disclosed herein. In some examples, the ED 52 may be an element of communications network infrastructure, such as a base station (for example a NodeB, an evolved Node B (eNodeB or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or Public Land Mobility Network (PLMN). In other examples, the ED 52 may be device that couples to the network infrastructure over a radio interface, such as a mobile phone, smart phone or other such device that may be classified as a User Equipment (UE). In some examples, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an example, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network 74, both wired and wireless network interfaces may be included. When ED 52 is a wirelessly coupled device, such as a UE, radio access network interface 72 may be present and it may be supplemented by other wireless interfaces such as WiFi network interfaces. The network interfaces 58 allow the ED 52 to communicate with remote entities such as those coupled to network 74.

The mass storage 62 may comprise any type of non-transitory storage device configured to store data, programs and other information and to make the data, programs and other information accessible via the bus 60. The mass storage 62 may comprise, for example, one or more of a solid state drive, hard disk drive, a magnetic disk drive or an optical disk drive. In some examples, mass storage 62 may be remote to ED 52 and accessible through use of a network interface such as interface 58. In the illustrated example, mass storage 62 is distinct from memory 56 where it is included, and may generally perform storage tasks compatible with higher latency, but may generally provide lesser or no volatility. In some examples, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in examples in which ED 52 is part of a data center, I/O interface 68 and Video Adapter 64 may be virtualized and provided through network interface 58.

In some examples, ED 52 may be a stand-alone device, while in other examples ED 52 may be resident within a data center. A data center, as will be understood in the art, is a collection of computing resources (typically in the form of services) that can be used as a collective computing and storage resource. Within a data center, a plurality of services can be coupled together to provide a computing resource pool upon which virtualized entities can be instantiated. Data centers can be coupled with each other to form networks consisting of pooled computing and storage resources coupled to each other by connectivity resources. The connectivity resources may take the form of physical connections such as Ethernet or optical communications links, and in some instances may include wireless communication channels as well. If two different data centers are coupled by a plurality of different communication channels, the links can be combined together using any of a number of techniques including the formation of link aggregation groups (LAGs). It should be understood that any or all of the computing, storage and connectivity resources (along with other resources within the network 74) can be divided between different sub-networks, in some cases in the form of a resource slice. If the resources across a number of coupled data centers or other collection of nodes are sliced, different network slices can be created.

Figure 2:
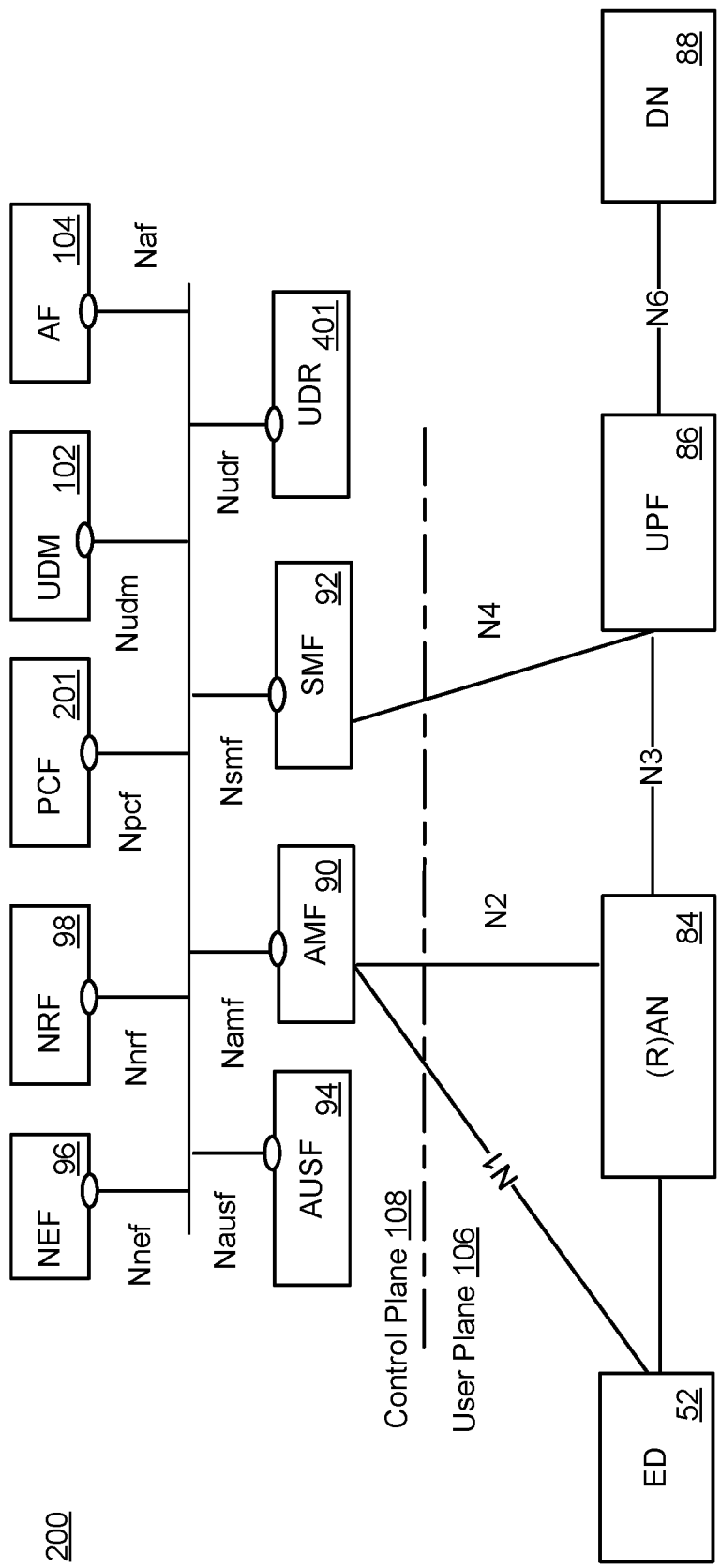
FIG. 2 is a block diagram illustrating a service-based view of a system architecture of a 5GCN.

FIG. 2 illustrates a service-based architecture 200 for a 5G or Next generation Core Network (5GCN/NGCN/NCN), shown generally at 200. This illustration depicts logical connections between nodes and functions, and its illustrated connections should not be interpreted as direct physical connection. ED 52 forms a radio access network connection with a (Radio) Access Network node (R)AN 84, which is coupled to a User Plane (UP) Function (UPF) 86 such as a UP Gateway of a network interface such as an N3 interface. UPF 86 coupled to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some examples DN 88 may represent an Edge Computing network or resources, such as a Mobile Edge Computing (MEC) network. ED 52 also couples to the Access and Mobility Management Function (AMF) 90. The AMF 90 is responsible for authentication and authorization of access requests, as well as mobility management functions. The AMF 90 may perform other roles and functions as defined by the 3GPP Technical Specification (TS) 23.501. In a service-based view, AMF 90 can communicate with other functions through a service-based interface denoted as Namf. The Session Management Function (SMF) 92 is a network function (NF) that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service-based view, through a service-based interface denoted as Nsmf. The Authentication Server function (AUSF) 94 provides authentication services to other NFs over a service-based Nausf interface. A Network Exposure Function (NEF) 96 can be deployed in the network to allow servers, functions and other entities such as those outside a trusted domain to have exposure to services and capabilities within the network. In one such example, the NEF 96 can act much like a proxy between an application server outside the illustrated network and NFs such as the Policy Control Function (PCF) 201, the SMF 92 and the AMF 90, so that the external application server can provide information that may be of use in the setup of the parameters associated with a data session. The NEF 96 can communicate with other NFs through a service-based Nnef network interface. The NEF 96 may also have an interface to non-3GPP functions. A Network Repository Function (NRF) 98, provides network service discovery functionality. The NRF 98 may be specific to the PLMN or network operator, with which it is associated. The service discovery functionality can allow NFs and UEs coupled to the network to determine where and how to access existing NFs, and may present the service-based interface Nnrf. PCF 201 communicates with other NFs over a service-based Npcf interface, and can be used to provide policy and rules to other NFs, including those within the control plane (CP) 108. Enforcement and application of the policies and rules is not necessarily the responsibility of the PCF 201, and is instead typically the responsibility of the functions to which the PCF 201 transmits the policy. In one such example the PCF 201 may transmit policy associated with session management to the SMF 92. This may be used to allow for a unified policy framework with which network behaviour can be governed. A Unified Data Management Function (UDM) 102 can present a service based Nudm interface to communicate with other NFs, and can provide data storage facilities to other NFs. Unified data storage can allow for a consolidated view of network information that can be used to ensure that the most relevant information can be made available to different NFs from a single resource. This can make implementation of other NFs easier, as they do not need to determine where a particular type of data is stored in the network. The PCF 201 may be associated with the UDM 102 because it may be involved with requesting and providing subscription policy information to the UDR 401, but it should be understood that typically the PCF 201 and the UDM 102 are independent functions. The PCF 201 may have a direct interface to the UDR 401. The stored data is typically associated with policy profile information (which may be provided by PCF 201) that governs the access rights to the stored data. In some example, the UDR 401 may store policy data, structured data for exposure, application data, as well as user subscription data which may include any or all of subscription identifiers, security credentials, access and mobility related subscription data and session related data. Application Function (AF) 104 represents the non-data plane also referred to as the non-user plane) functionality of an application deployed within a network operator domain and within a 3GPP-compliant network. The AF 104 interacts with other core NFs through a service-based Naf interface, and may access network capability exposure information, as well as provide application information for use in decisions such as traffic routing. The AF 104 can also interact with functions such as the PCF 201 to provide application-specific input into policy and policy enforcement decisions. It should be understood that in many situations the AF 104 does not provide network services to other NFs, and instead is often viewed as consumer or user of services provided by other NFs. An application function outside the 3GPP network can perform many of the same functions as AF 104 through the use of NEF 96.

Figure 3:
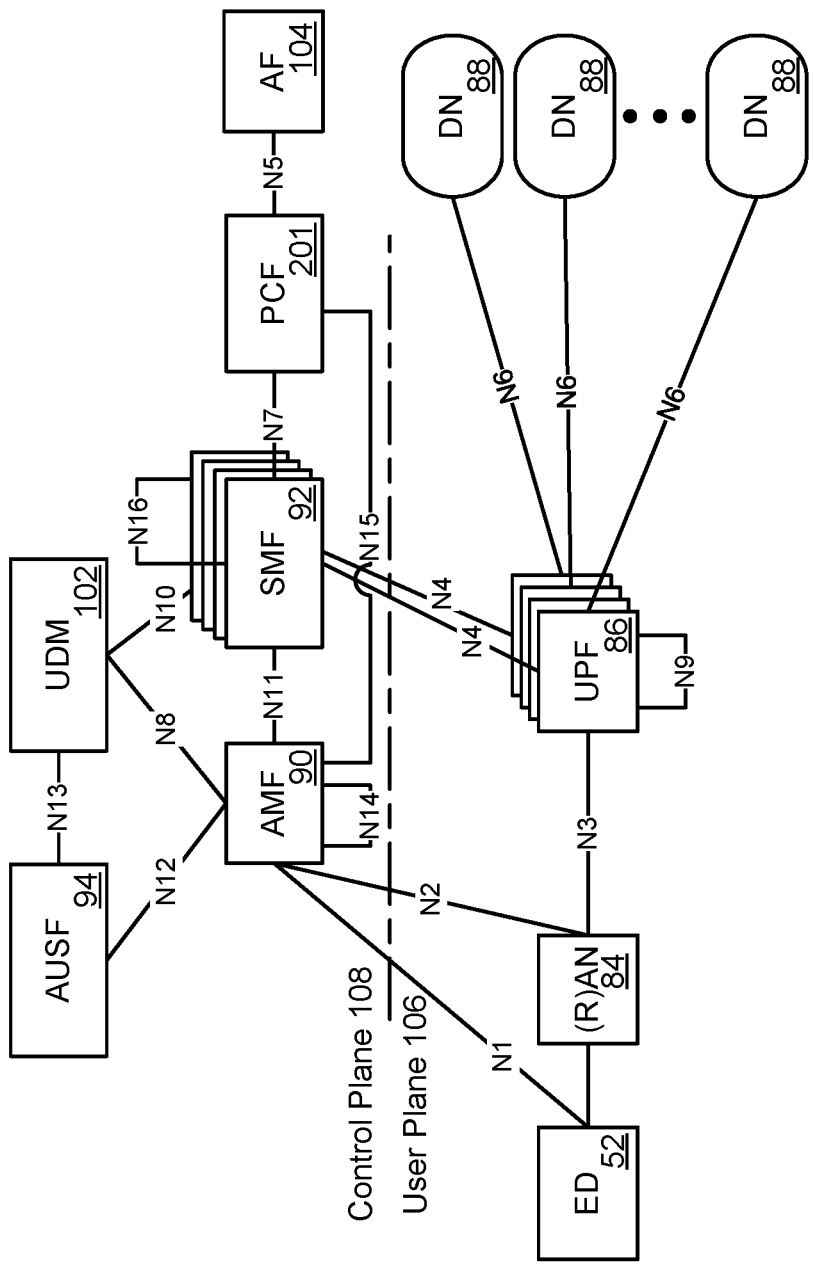
FIG. 3 is a block diagram illustrating the system architecture of a 5GCN as shown in FIG. 2 from the perspective of reference point connectivity.

ED 52 communicates with NFs that are in the UP 106, and the CP 108 depicted in FIG. 3. The UPF 86 is a part of the CN UP 106 (DN 88 being outside the 5GCN). (R)AN 84 may be considered as a part of a UP, but because it is not strictly a part of the CN, it is not considered to be a part of the CN UP 106. AMF 90, SMF 92, AUSF 94, NEF 96, NRF 98, PCF 201 and UDM 102 are functions that reside within the CN CP 108 and are often referred to as CP Functions (CPFs). AF 104 may communicate with other functions within CN CP 108 (either directly or indirectly through the NEF 96), but is typically not considered to be a part of the CN CP 108.

Those skilled in the art will appreciate that there may be a plurality of UPFs 86 coupled in series between the (R)AN 84 and the DN 88, and as will be discussed with respect to FIG. 3, multiple data sessions to different DNs can be accommodated through the use of multiple UPFs 86 in parallel.

FIG. 3 illustrates a reference point representation of a 5GCN architecture 300. For the sake of clarity, some of the NFs illustrated in FIG. 2 are omitted from this figure, but it should be understood that the omitted functions and those not illustrated in either FIG. 2 or FIG. 3) can interact with the illustrated functions.

ED 52 couples to both (R)AN 84 (in the UP 304) and AMF 90 (in the CP 306). The ED-to-AMF connection is an N1 connection. (R)AN 84 also couples to the AMF 90, and does so over an N2 connection. The (R)AN 84 couples to a UPF function 86 of an N3 connection. The UPF 86 is associated with a PDU session, and couples to the SMF 92 over an N4 interface to receive session control information. If the ED 52 has multiple PDU sessions active, they can be supported by multiple different UPFs 86, each of which is coupled to an SMF 92 over an N4 interface. It should be understood that from the perspective of reference point representation, multiple instances of either an SMF 92 or an UPF 86 are considered as distinct entities. The UPFs 86 each couple to at least a DN 88 outside the 5GCN over an N6 interface. SMF 92 couples to the PCF 201 over an N7 interface, while the PCF 201 couples to an AF 104 over an N5 interface. The AMF 90 couples to the UDM 102 over an N8 interface. If two UPFs 86 in UP 304 couple to each other, they can do so over an N9 interface. The UDM 102 can couple to an SMF 92 over an N10 interface. The AMF 90 and SMF 92 couple to each other over an N11 interface. An N12 interface couples the AUSF 94 to the AMF 90. The AUSF 94 can couple to the UDM 102 over an N13 interface. In networks in which there is a plurality of AMFs 90, they can couple to each other over an N14 interface. The PCF 201 can couple to an AMF 90 over the N15 interface. If there is a plurality of SMFs 92 in the network, they can communicate with each other over an N16 interface.

It should also be understood that any or all of the functions and nodes, discussed above with respect to the architectures 200 and 300 of the 5GCN, may be virtualized within a network, and the network itself may be provided as network slice of a larger resource pool, as will be discussed below.

Introduction of Information Elements

The present disclosure introduces a plurality of information elements that may be integrated within a plurality of PCF 201 policies to provide additional granularity to govern the operation of a UE 52. Accordingly, the PCF 201, with input from the NWDAF for, by way of non-limiting example, obtaining statistical and/or analytical information of various network parameters, including without limitation, network traffic load, network slice traffic load, resource utilization, traffic distribution in different network locations, quality of experience (QoE), UE mobility information, UE behavior information and/or QoS, includes one or more of such new information elements as information elements of the various UE policies either alone or in combination with each other and/or with other information elements including, without limitation, S-NSSAI, RAT, application ID and/or a packet filter descriptor to provide, guidance to the UE 52 to optimize its access of the best available network resources.

The PCF 201 may establish and maintain policies comprising one or more rules incorporating such information elements as parameters thereof and may send them to the UE 52. In some examples, the rules may be provided to the UE 52 during the initial registration of the UE 52 with the network. In some examples, the rules may be provided to the UE 52 as a policy update when the UE 52 changes its status such that it is appropriate to provide one or more of such rules to the UE 52. In some examples, the PCF 201 may provide a policy update to the UE 52 at other points in time, including, without limitation, when one or more of such rules has been updated. In some examples, depending upon network loading, the ability of the PCF 201 to provide a policy update to the UE 52 may be delayed or obviated entirely. In some examples, the SMF 92 may provide one or more rules to the UE 52 (and/or update one or more rules previously provided) during PDU session establishment and/or PDU session modification procedures.

The present disclosure contemplates two of such information elements, namely a location element and a time element that may be introduced individually or collectively into one or more of such policies.

Location Element

The location element indicates a geographic indication of where the UE 52 could use a given rule of a given policy. The location element may take the form, without limitation, of any or all of:

- a geographical location that may be specified by a 2D and/or a 3D coordinate system;
- a geographical location that may be specified by a unique identifier of a geographical zone of a predetermined mapping system. The zone may overlap another zone or the zones may be non-overlapping. In some examples, the map may be sent from the 5G core network (CN) function to the UE 52 by a CP 306 interface, including without limitation, the N1 interface, or from an AS to the UE 52 over a UP 304 data connection;
- a list of RAN 84 addresses that may, in some examples be internet protocol (IP) addresses and/or fully qualified domain names (FQDNs);
- an access type that may, in some examples, be a non-3GPP AN such as Wi-Fi, or a 3GPP AN such as, without limitation, 3G, 4G, 5G and/or 6G RAN 84;
- a list of cell identifiers and/or a list of RAN identifiers that each identify the identity of a radio node that sends and receives radio signals to couple a UE 52 to a DN 88;
- a tracking area identifier (TAI) that identifies a tracking area. In some examples, a tracking area may comprise a list of cell identifiers and/or a list of RAN node identifiers;
- a registration area identifier that uniquely indicates a specific registration area. In some examples, the UE 52 may store registration areas in a local storage. In some examples, the registration area may comprise a set of tracking areas; and/or an indication that the policy rule covered by the location element is applicable to any location.

Time Element

The time element indicates a date and/or time and/or range thereof during which the UE 52 could use a given rule of a given policy. The time element may take the form, without limitation, of any or all of:

a start time of day;
an end time of day;
a start date;
an end date;
a day (and/or a list of days) of week;
a day (and/or a list of days) of month;
a month (and/or a list of months in a year);
a year (and/or a list of years) and/or a start year and/or an end year;
one or more periods that each specify a start and an end time and/or day and/or a recurrence; and/or
an indication that the policy rule covered by the time element is applicable to any time.

It will be appreciated that in addition to the two information elements identified, namely the location element and the time element, other information elements may present themselves to those of ordinary skill in this art upon consideration of the present disclosure and without departing from its scope.

A number of non-limiting examples will now be described showing how the new information elements may be introduced into rules of various policies that govern how a UE 52 may exchange packets with an AS along the network, including without limitation, the policies identified above. It will be appreciated that these are examples only, and that these (and other) information elements may be introduced, into these (and other) policies by virtue of the described (and other) example mechanisms upon consideration of the present disclosure and without departing from its scope.

For each type of policy, the PCF 201 may transmit one or more policy rules along the network to the UE 52, where each policy rule covers different location information element and/or time information element. The various location information element and/or the time information element in various policy rules may be overlapping or non-overlapping. It is understandable that the terminologies "information element" and "element information" are changeable in the embodiments of the present invention. For example, the location element information can be named as the location information element and time element information can be named as time information element.

The application software in the UE 52 may have a user interface by which this information is presented to a user of the UE 52. By viewing the policies (and policy rules thereof) using such a user interface, the user may decide where and when to use one or more network services, including without limitation, voice, video and/or data services. The user may also decide when and where to access one or more radio access types, including without limitation, 3GPP ANs and/or non-3GPP ANs. In some examples, the software in the UE 52 may automatically select and use network services, including without limitation, 3GPP ANs and/or non-3GPP ANs and/or network slice(s) based upon the location information element and/or the time information element contained in individual policy rules.

In some non-limiting examples, the PCF 201 may include one or more indications, including without limitation, an enforcement indication, that stipulates whether or not the location information element and/or the time information element will or will not be strictly enforced.

In some non-limiting examples, the PCF 201 may inform the SMF 92 of the applicable indication(s) for the location information element and/or the time information element of individual policy rules. In turn, in some non-limiting examples, the SMF 92 may forward the indication(s) to the UPF 86 and/or to the RAN 84.

In some non-limiting examples, the PCF 201 may include the applicable indication(s) for the location information element and/or the time information element of individual policy rules in the UE policies themselves, including without limitation, the URSP.

If the indication(s) stipulate that the location information element and/or the time information element will be strictly enforced, the UE 52 will be precluded from exchanging packets in accordance with the rule associated therewith, in that one or more of the UE 52, the UPF 86 and/or the RAN 84 will drop packets of PDU session(s) and/or QoS flow(s) that do not satisfy the location information element and/or the time information element.

If the indication(s) stipulate that the location information element and/or the time information element will not be strictly enforced, one or more of the UE 52, the UPF 86 and/or the RAN 84 may preclude the UE 52 from exchanging packets in accordance with the rule associated therewith. Alternatively, one or more of the UE 52, the UPF 86 and/or the RAN 84 may choose to allow the UE to exchange packets in accordance with any constraints contained in the rule associated therewith, instead of precluding the exchange of or dropping of packets of QoS flow(s) and/or PDU session(s) that do not satisfy the location information element and/or the time information element. The charging system may apply a different criterion to the packets that are exchanged even thought they do not satisfy the location information element and/or the time information element. In some non-limiting examples, the different criterion may be a higher charging rate. Alternatively, the different criterion may be that the PCF 201 may have different QoS policies to be applied to the packets exchanged that do not satisfy the location information element and/or the time information element.

URSP

The PCF 201 provisions the UE 52 with URSP rules of the home PLMN (HPLMN). In some examples, the UE 52 may have been pre-configured with URSP rules by the mobile network operator (MNO) or otherwise. In such case, the URSP rules provisioned by the PCF 201 will take precedence over any pre-configured URSP rules. Additionally, the PCF 201 in the HPLMN may update the URSP rule in the UE 52 when it is roaming. The URSP has been described at least in 3GPP TS 23.503.

In some examples, the PCF 201 includes the location element and/or the time element as an information element within the URSP. The location element and/or time information element are sent to the UE 52 as part of one or more of the rules defined incorporating these information elements.

In some examples, each URSP rule communicated to, and stored in the UE 52, has, in addition to a rule precedence value that determines the priority of the rule within the URSP, one or more of location information element and/or time information element that respectively determine the location(s) and/or the time period(s) to apply the URSP rule. The PCF 201 may provide the UE 52 with one or more URSP rules for respectively, any location within the network and/or time and/or time period. For each URSP rule, if location information element is provided, the URSP rule may be applied only for the location(s) described by the location information element. If no location information element is provided, the URSP rule may be applied irrespective of the location of the UE 52. Similarly, for each URSP rule, if time information element is provided, the URSP rule may be applied only for the time(s) described by the time information element. If no time information element is provided, the URSP rule may be applied irrespective of the time of the UE 52.

Each URSP rule contains a traffic descriptor that determines under what traffic conditions, the URSP will be applied. The traffic descriptor works in conjunction with either or both of the location information element and/or time information element so that traffic that satisfies the traffic descriptor may be sent to the network only when the UE 52 is in a location and/or a time period that respectively satisfies the location information element and/or the time information element. Otherwise, even though a packet satisfies the traffic descriptor, one or more of the UE 52 and/or the UPF 86 may drop it.

Each URSP rule contains a list of route selection descriptors each of which has, in addition to a route selection descriptor precedence value that determines the priority of the route selection descriptor, one or more of location information element and/or time information element that respectively determine the location(s) and/or the time period(s) to apply the route selection descriptor. In some examples, the route selection descriptor may comprise one or more of the following components:

- a session and service continuity (SSC) mode that indicates that traffic of a matching application will be routed via a PDU session supporting SSC mode. In some examples, the SSC mode may have one or more of SSC location information element and/or SSC time information element respectively indicating the location and/or time when the SCC mode policy may be applied;
- a network slice selection that indicates that traffic of a matching application will be routed via a PDU session supporting any of the included S-NSSAIs. In some examples, the network slice selection may have one or more of network slice selection location information element and/or network slice selection time information element respectively indicating the location and/or time when the network slice selection policy may be applied. In some examples, a mobile network operator may use the network slice selection location information element and/or network slice selection time information element to indicate the availability of network slices at respectively, certain locations and/or time periods. By way of non-limiting example, if an URLLC service may be provided by a 5G RAN 84 along a highway, the network slice selection may include as network slice selection location information element, a list of RAN nodes 84 installed along the highway. In another non-limiting example, the network may be optimized so that when the traffic load of a certain network slice is low, the network management may turn off computing hardware associated with such network slice to save energy and divert the traffic to be handled by other network slices. In such a scenario, one or more of network slice selection time information element may be used to indicate only the time period(s) when the network slice is accessible.
- a data network name (DNN) selection that indicates that the traffic of a matching application is to be routed via a PDU session supporting any of the included DNNs. In some examples, the DNN selection may have one or more of DNN selection location information element and/or DNN selection time information element to indicate the location and/or time when the DNN selection policy is to be applied. In some non-limiting examples, IP multimedia subsystem (IMS) voice service, IMS video service and/or local area data network (LADN) service may be available in certain locations and/or time periods. In such a scenario, a MNO may use the DNN selection location information element and/or the DNN selection time information element to so advise the UE 52.
- a non-seamless off-load indication that indicates that traffic of a matching application is to be off-loaded to a non-3GPP AN outside of a PDU session. In some examples, the non-seamless off-load indication may have one or more of non-seamless off-load indication location information element and/or non-seamless off-load indication time information element to indicate the location and/or time when the non-seamless off-load indication may be applied. In some non-limiting examples, a video stream application may use a non-3GPP AN at certain locations and/or time periods. In such a scenario, an MNO may use the non-seamless off-load indication location information element and/or non-seamless off-load indication time information element to so advise the UE 52.
- an access type preference that indicates the access type (3GPP or non-3GPP AN) on which the PDU session should be established. In some examples, the access type preference may have one or more of access type preference location information element and/or access type preference time information element to indicate the location and/or time when the access type preference is to be enforced. By way of non-limiting example, a video streaming application may use a non-3GPP access type at certain locations and/or time periods. In such a scenario, an MNO may use the access type preference location information element and/or access type preference time information element to so advise the UE 52.

In some examples, the SMF 92 may send one or more of location information element and/or time information element, together with related information, including without limitation, the S-NSSAI, DNN, application ID, packet filter (including without limitation for IP, Ethernet or unstructured data) to the RAN 84 and/or UPF 86 during PDU session establishment and/or PDU session modification procedures.

In such examples, the possibility exists that the UE 52 erroneously sends PDU(s) that satisfy the criteria established by the related information, but do not satisfy any of the information elements associated with the location element (including in its various incarnations, including without limitation, SSC location information element, network slice selection location information element, DNN selection location information element, non-seamless off-load indication location information element and/or access type preference location information element) and/or the time element (including in its various incarnations, including without limitation, SSC time information element, network slice selection time information element, DNN selection time information element, non-seamless off-load indication time information element and/or access type preference time information element).

In such circumstances, the RAN node 84 and/or the UPF 86 may detect such packets and notify the SMF 92. In some non-limiting examples, the RAN 84 and/or the UPF 86 may drop such packets if it is stipulated that the location information element and/or time information element of particular rules are to be strictly enforced. The SMF 92 may then decide to deactivate the UP connection of the PDU session used to carry the offending PDUs. Alternatively, the SMF 92 may then decide to release the PDU session used to carry the offending PDUs and/or send a notification message to the AMF 90 advising that the UE 52 is sending traffic in violation of one or more of the location element and/or the time element. The AMF 90 may then perform an AN release procedure to cause the UE 52 to enter into a CM-IDLE state. Alternatively, the AMF 90 may perform a UE deregistration procedure to de-register the UE 52. In the further alternative, the AMF 90 may send a mobility management (MM) message along an N1 interface to the UE 52 requesting it to cease sending traffic in violation of the location element and/or time element criteria.

In some examples, a visiting PCF 201 (V-PCF) in a visiting PLMN (VPLMN) may obtain the URSP rules from the HPLMN and modify the location element and/or the time element to correspond to respective parameters of the HPLMN.

With the introduction of the location element and/or time element as parameters upon which one or more URSP rules may be conditioned, the PCF 201 may simultaneously send multiple URSP rules to the UE 52. This obviates the PCF 201 having to set up a mechanism to send a URSP rule whenever it detects that the UE 52 has satisfied the condition(s) set out in either or both of the location element and/or time element and to send a further URSP rule whenever it detects that the UE 52 no longer satisfies such condition(s), which would otherwise incur considerable network resources and consume considerable UE power in updating the UE policies.

Rather, the UE 52 may make use of the location element and/or time information element contained in the URSP rules to derive network information. By way of non-limiting example, and considering only the location element in such example, there may be different access technologies (ATs) (including without limitation, 3GPP 4G RAN 84, 3GPP 5G RAN 84 and/or non-3GPP ANs) in different geographical areas of the network. The UE 52 may use the information contained in the location element and network service availability to select suitable communication parameters, as shown in the following non-limiting example scenarios:

The UE 52 knows of the availability of Wi-Fi or 5G RAN 84 in certain network locations and may also have a map showing the network ATs. The UE 52 may be relocated by its associated user to a location to take advantage of a desired RAT (such as going to a location that offers Wi-Fi and/or 5G RAN 84);

The UE 52 uses URSP information elements (including without limitation, the access type preference, the access type preference location information element and/or DNN selection location information element), as well as time information element associated with URSP information elements (including without limitation, SSC time information element, network slice selection time information element, DNN selection time information element, non-seamless off-load indication time information element and/or access type preference time information element) to activate a suitable communication interface, such as, by non-limiting example, a 5G RAN 84 interface, when the UE 52 is moved to an area that offers a given AT. This ability may reduce the time that the UE 52 would otherwise incur searching for RANs 84 (including without limitation, Wi-Fi radio nodes, Wi-Fi access points (APs) and/or 4G and/or 5G radio base stations (BSs));

The UE 52 may know of locations that offer specific services, including without limitation, an LADN. The UE 52 may use the DNN as a proxy indication of availability of an LADN. Furthermore, by using URSP information elements associated with the location element (including in its various incarnations, including without limitation, SSC location information element, network slice selection location information element, DNN selection location information element, non-seamless off-load indication location information element and/or access type preference location information element) and/or the time element (including in its various incarnations, including without limitation, SSC time information element, network slice selection time information element, DNN selection time information element, non-seamless off-load indication time information element and/or access type preference time information element), the UE 52 may establish a PDU session or activate UP connection of an existing PDU session to couple to the DNN and use the services provided thereby when the UE 52 enters a location and/or time period that satisfies such information elements.

ANDSP

In some examples, the PCF 201 includes one or more of the location element and the time element as an information element within the ANDSP. The location element and/or time information element are sent to the UE 52 as part of one or more of the ANDSP rules defined incorporating these information elements. In some examples, the mechanism may be similar to that described above in connection with the URSP.

UBDTP

The UBDTP provides network information to the UE 52 that allows the UE 52 to request PDU sessions with an appropriate QoS for the upload of background data to an AS located in the DN 88 or connected to the DN 88.

In some examples, the PCF 201 may provide background data transfer policies to the UE 52 at any time, including without limitation, during initial registration of the UE 52, or when the UE 52 changes location. However, network congestion may preclude the provision by the PCF 201 of a policy update when desired. In some examples, the PCF 201 includes one or more of the location element and/or the time element as an information element within the UBDTP. The location element and/or the time information element are sent to the UE 52 within the UBDTP. This allows the PCF 201 to provide multiple policy rules to the UE 52 proactively when network congestion permits.

The UBDTP involves four phases, namely, an identification phase, a rules definition phase, an AS configuration and an operation phase. These phases will be discussed separately below.

UBDTP Identification Phase

In the UBDTP identification phase, the CN identifies whether a given UE 52 is one for which specification of UBDTP rules is appropriate. There are a number of mechanisms by which this identification may be made, including without limitation:

the CN and/or OAM function configuring the UE subscription data of the UE 52 in the UDM 102 and/or UDR 401 to receive UBDTP service, the CN and/or OAM function configuring the UE subscription data of the UE 52 in the PCF 201 to receive UBDTP service, the CN receiving a request for UBDTP service from the UE 52, and the CN receiving a notification from an AF 104 identifying the UE 52 as receiving UBDTP service.

In a first mechanism, the CN may configure the UE 52 in the UDM 102 and/or UDR 401 to receive UBDTP service. In such a mechanism, an indicator may be used to indicate that the UE 52 is to receive UBDTP service. Such an indicator may be stored in the subscription data of the UE 52 and/or as part of the access and mobility subscription data, in the UDR 401 and/or UDM 102. In some examples, the indicator may take on values that respectively indicate that UBDTP service is allowed or disallowed.

In such a mechanism, the AMF 90 retrieves the subscription data of the UE 52 from the UDM 102, including the indicator, such as, by a Nudm_SDM_Get service operation of the UDM 102, during registration of the UE 52. Thereafter, the AMF 90 may perform a policy association establishment procedure as disclosed at least in 3GPP TS 23.502 and in particular, clause 4.16.1.2 thereof. If the indicator indicates that UBDTP service is allowed, the PCF 201 provides the AMF 90 with UBDTP information (which may in some examples be a new set of UBDTP to be added to the UE 52, or to delete and/or modify an existing set of UBDTP in the UE 52) and the AMF 90 deploys the UBDTP to the UE 52, including without limitation, using a UE 52 update deliver procedure such as is disclosed at least in 3GPP TS 23.502, and in particular, clause 4.2.4.3 thereof.

In some examples, UBDTP service may be allowed or disallowed on a network slice instance (NSI) (in some non-limiting examples, represented by an S-NSSAI) basis and/or for an internal group of UEs 52. In such a scenario, the second mechanism, in which the CN configures the UE 52 in the PCF 201 to receive UBDTP service may be appropriate. In such a mechanism, the AMF 90 may send a request to the PCF 201 for UE access selection and/or PDU session selection information. In some examples, such a request may include the appropriate S-NSSAI and/or internal group ID. The PCF 201 checks the information provided by the AMF 90 and makes a decision as to whether or not to allow UBDTP service to the UE 52, such as, by way of example, a scenario where the S-NSSAI and/or internal group ID is associated with UEs that will use UBDTP. If the PCF 201 decides to allow UBDTP service, it may provide the AMF 90 with UBDTP information as part of the UE access selection and/or PDU session selection information, as is disclosed at least in 3GPP TS 23.503, and in particular, clause 6.6 thereof, or as independent application information and the AMF 90 deploys the UBDTP to the UE 52, including without limitation, using a UE 52 update deliver procedure such as is disclosed at least in 3GPP TS 23.502, and in particular, clause 4.2.4.3 thereof.

In a third mechanism, the UE 52 may send a request to the AMF 90 for UBDTP service during UE registration, such as is disclosed at least in 3GPP TS 23.502, and in particular step 1 of clause 4.2.2.2.2 or clause 4.2.2.2.3 thereof, but including an indicator that UBDTP service has been requested. The RAN 84 forwards the UE registration request to the AMF 90. The AMF 90 checks to see if the indicator has been included in the request, and if so, sends the indicator (or another indicator corresponding thereto) to the PCF 201 to request UBDTP service. The PCF 201 checks the information provided by the AMF 90 and makes a decision as to whether or not to allow UBDTP service to the UE 52, such as, by way of example, a scenario where the S-NSSAI, internal group ID and/or DNN is associated with UEs 52 that will use UBDTP. If the PCF 201 decides to allow UBDTP service, it may provide the AMF 90 with UBDTP information as part of the UE access selection and/or PDU session selection information or as independent application information and the AMF 90 deploys the UBDTP to the UE 52, including without limitation, using a UE update deliver procedure such as is disclosed at least in 3GPP TS 23.502, and in particular, clause 4.2.4.3 thereof.

In a fourth mechanism, the CN may receive a notification from an AF 104 identifying the UE 52 as receiving UBDTP service, such as is disclosed at least in 3GPP TS 23.502, and in particular, clause 4.16.7 thereof.

Figure 4:
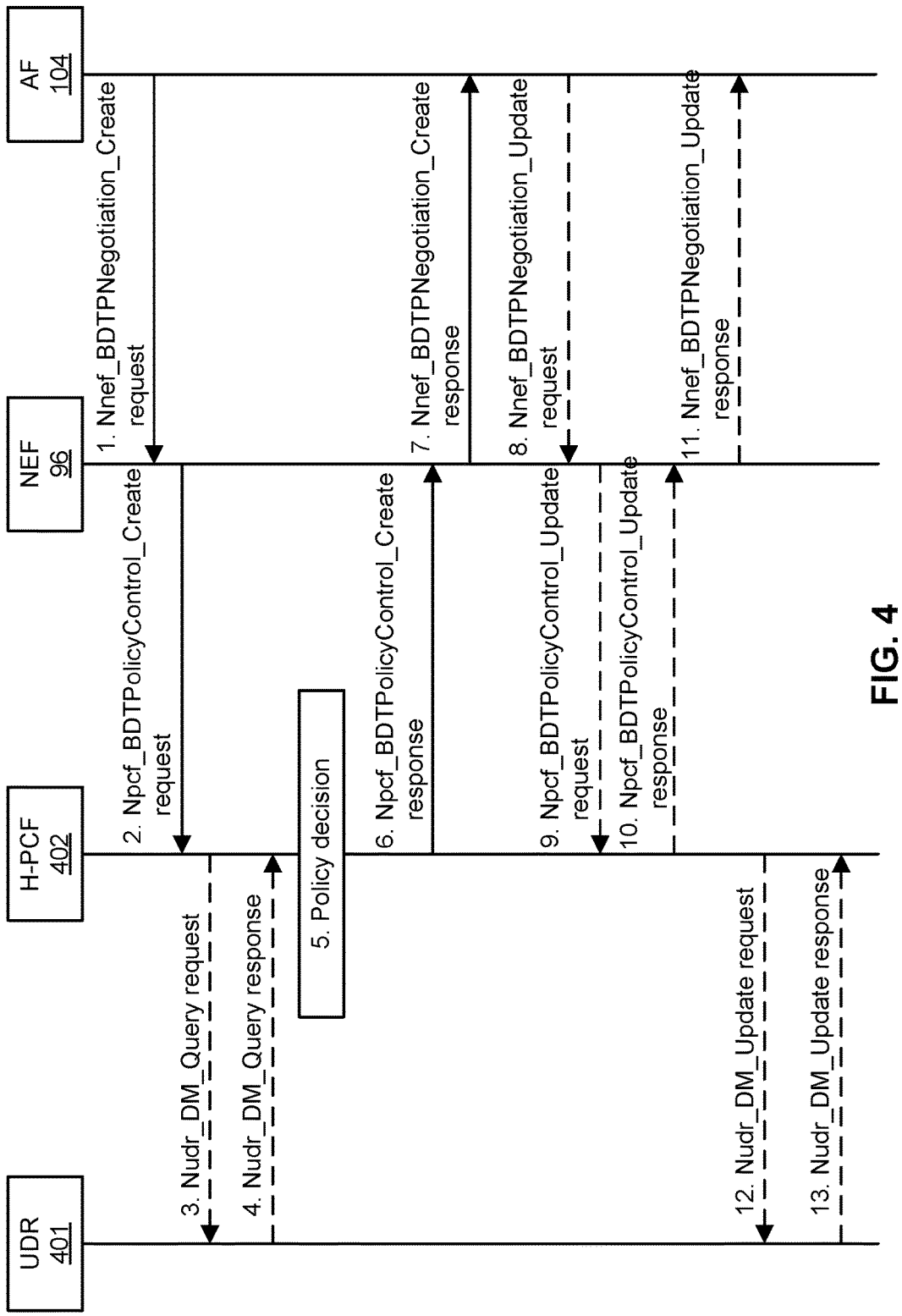
FIG. 4 is a signal flow diagram showing example signal flows by which an NEF may negotiate with an H-PCF about transfer policies for future background data transfer according to an example.

FIG. 4 is an example signal flow diagram shown generally at 400. The figure shows communications between a UDR 401, a home PCF (H-PCF 402), an NEF 96 and an AF 104 in a negotiation between the NEF 96 and the H-PCF 402 about the transfer policies, including without limitation, a desired time window, a charging rate (or reference thereto) and/or a maximum aggregated bit rate (such as is disclosed at least in 3GPP TS 23.203 and in particular, clause 6.1.16 thereof) for future background data transfer, such as is disclosed at least in 3GPP TS 23.503 and in particular clause 6.1.2.4 thereof.

The negotiation may be conducted prior to establishment of a PDU session for the UE 52 and in some examples when the AF 104 initiates a procedure to the NEF 96. Thereafter, the NEF 96 may apply the UBDTP for an individual UE 52, including without limitation, by invoking a Npcf_PolicyAuthorization_Create and/or a Npcf_PolicyAuthorization_Update service operation directly with the PCF 201 and/or indirectly through the policy control function (PCF) 201. Such service operation will include an indication to request the CN to allow UE(s) 52 to use the UBDTP. In some examples, the AF 104 includes information indicating which UEs 52 will be allowed to use the UBDTP, including without limitation, one or more external UE ID(s), GPSI(s), external group ID(s), S-NSSAI(s), DNN(s), application identifier(s) and/or AF-service identifier(s). In some non-limiting examples, the AF 104 may specify desired network area information and/or desired time window(s).

In some non-limiting examples, the AF 104 may include one or more indications as to whether or not the desired network area information and/or the desired time window(s) will or will not be strictly enforced. If the indication(s) stipulate that the desired network area information and/or the desired time window(s) will be strictly enforced, the PCF may specify one or more of UBDTP for the UE 52 such that the UE 52 will not be allowed to use the background data transfer service for packets of PDU session(s) and/or QoS flow(s) that do not satisfy the desired network area information and/or the desired time window(s). If the indication(s) stipulate that the location information element and/or the time information element will not be strictly enforced, the PCF may specify one or more of UBDTP for the UE 52 such that the UE 52 may choose to send, instead of dropping, packets of PDU session(s) and/or QoS flow(s) that do not satisfy the location information element and/or the time information element, to have the 5G system apply a different charging policy to the PDU session(s) and/or QoS flow(s) that do not satisfy the location information element and/or the time information element and/or to have the PCF 201 apply a different QoS policy to the PDU session(s) and/or QoS flow(s) that do not satisfy the location information element and/or the time information element and/or the SMF 92 may send different QoS parameters to the UE 52, RAN 84, and UPF 86 to be applied to the PDU session(s) and/or QoS flow(s) that do not satisfy the location information element and/or the time information element.

Step 1. The negotiation is commenced when the AF 104 invokes the Nnef_BDTPNegotiation_Create service such as is described at least in TS 23.502, and in particular, clause 5.2.6.6.2 thereof. In some examples, the AF 104 may include information indicating which UEs 52 will be allowed to use the UBDTP, including without limitation, one or more external UE ID(s), GPSI(s) of UE(s) 52, external group ID(s), S-NSSAI(s), DNN(s), application identifier(s) and/or AF-service identifier(s).

Step 2. In response thereof, the NEF 96 invokes the Npcf_BDTPolicyControl_Create request service with the H-PCF 402, as is described at least in 3GPP TS 23.502, and in particular, clause 5.2.5.5.2 thereof, to authorize creation of the UBDTP. If the UE 52 information is provided in step 1, the NEF 96 may map the external UE ID to another internal UE ID, such as a SUPI, a subscription concealed identifier (SUCI) and/or a GPSI and/or may map the external group ID to an internal group ID. In some non-limiting examples, the NEF 96 may include the UE 52 information, after mapping the received UE 52 information to internal parameters as discussed above, in the Npcf_BDTPolicyControl_Create request message.

Step 3. The H-PCF 402 may request from the UDR 401 all the stored transfer policies corresponding to the application service provider (ASP) identifier. The H-PCF 402 may recognize the network slice to which the ASP belongs from the ASP identifier. If the List of UE IDs that can use background data transfer service is provided in step 1, the H-PCF 402 forwards the list of UE IDs to the UDR 401. In case only one H-PCF 402 is deployed in the PLMN, the transfer policy can be locally stored and no interaction with UDR 401 is required.

Step 4. The UDR 401 provides all the stored transfer policies and corresponding network area information associated with the ASP identifier to the H-PCF 401. If the List of UE IDs that can use background data transfer service is provided in step 3, the UDR 401 marks UE can use background data transfer (BDT) service in the Session Management Subscription Data.

Step 5. The H-PCF 402 determines, based on information provided by the AF 104 and other available information one or more transfer policies, including URSP of UBDTP for background data transfer. The maximum aggregated bitrate is not enforced in the network.

Step 6. The H-PCF 402 send the acknowledge message to the NEF 96 with the acceptable transfer policies and a Background Data Transfer Reference ID. The NEF 96 forwards the received transfer policies to the AF 104 and stores the Background Data Transfer Reference ID for future interaction with the PCF 402.

Step 7. The NEF 96 sends a Nnef_BDTPNegotiation_Create response to the AF 104 to provide one or more background data transfer policies to the AF 104. If the NEF received only one background transfer policy from the H-PCF 402, steps 8-11 are not executed and the flow proceeds to step 12. Otherwise, the flow proceeds to step 8.

Step 8. Ultimately, the AF 104 invokes the Nnef_BDTPNegotiation_Update request service, such as is described at least in 3GPP TS 23.502, and in particular clause 5.2.6.6.3 thereof, to provide the NEF 96 with one or more selected UBDTP updates, in some examples, including information indicating which UE(s) 52 will be allowed to use the UBDTP, including without limitation, one or more external UE ID(s), GPSI(s), external group ID(s), S-NSSAI(s), DNN(s), application identifier(s) and/or AF-service identifier(s).

Step 9. The NEF 96 invokes the Npcf_BDTPolicyControl_Update service to provide the H-PCF 402 with the selected background data transfer policy and the associated Background Data Transfer Reference ID.

Step 10. The H-PCF 402 sends the acknowledge message to the NEF 96.

Step 11. The NEF 96 sends the acknowledge message to the AF 104. If the NEF 96 receives only one transfer policy, the AF 104 is not required to confirm.

Step 12. The H-PCF 402 stores the reference ID together with the new transfer policy and the corresponding network area information in the UDR 401. This step is not executed, when the H-PCF 402 decides to locally store the transfer policy. If the List of UE IDs that can use background data transfer service is provided in step 8, the H-PCF 402 forwards the list of UE IDs to the UDR 401 and action to be taken.

Step 13. The UDR 401 sends a response to the H-PCF 402 as its acknowledgement.

UBDTP Rules Definition Phase

In some examples, rather than sending a UBDTP to the UE 52, the PCF 201 may send a URSP policy to the UE 52 which the UE 52 may use to perform background data transfer to its associated AS. Such URSP may contain a traffic descriptor that matches the application ID, IP descriptor and/or non-IP descriptor and/or DNN used by the UE 52 to send background data to the associated AS. In some examples, each URSP rule communicated to, and stored in the UE 52, has, in addition to a rule precedence value that determines the priority of the rule within the UBDTP, a URSP rule value that determines the URSP rule(s) to be applied to the QoS flow(s) and/or PDU session(s) that shall be established to deliver background data and a DNN selection that determines the DNN to which the UBDTP applies, one or more of location information element and/or time information element that respectively determine the location(s) and/or time period(s) to enforce the UBDTP rule. The PCF 201 may provide the UE 52 with one or more URSP rules for respectively, any location within the network and/or time and/or time period.

In some non-limiting examples, the PCF 201 may include one or more indications as to whether or not the location information element and/or the time information element contained in one or more policy rules will or will not be strictly enforced. These indications may or may not be decided based on the information provided by the AF 104. If the indication(s) stipulate that the location information element and/or the time information element will be strictly enforced, the UE 52 will not be allowed to use the background data transfer service for packets of PDU session(s) and/or QoS flow(s) that do not satisfy the location information element and/or the time information element. If the indication(s) stipulate that the location information element and/or the time information element will not be strictly enforced, the UE 52 may choose to send, instead of dropping, packets of PDU session(s) and/or QoS flow(s) that do not satisfy the location information element and/or the time information element, to have the 5G system apply a different charging policy and/or QoS policy to the traffic that does not satisfy the location information element and/or the time information element.

For each URSP rule, if location information element is provided, the URSP rule may be applied only for the location(s) described by the location information element. If no location information element is provided, the URSP rule may be applied irrespective of the location of the UE 52. Similarly, for each URSP rule, if time information element is provided, the URSP rule may be enforced only for the time(s) described by the time information element. If no time information element is provided, the URSP rule may be applied irrespective of the time of the UE 52.

Otherwise, in the UBDTP rules definition phase, the PCF 201 provisions the UE 52 with UBDTP rule(s) of the HPLMN. In some examples the UE 52 may have been pre-configured with UBDTP rules by the MNO or otherwise. In such case, the UBDTP rules provisioned by the PCF 201 will take precedence over any pre-configured UBDTP rules. Additionally, the PCF 201 in the HPLMN may update the UBDTP rule in the UE 52 when it is roaming.

In some examples, each UBDTP rule communicated to, and stored in the UE 52, has, in addition to a rule precedence value that determines the priority of the rule within the UBDTP, one or more of location information element and/or time information element that respectively determine the location(s) and/or time period(s) to enforce the UBDTP rule. The PCF 201 may provide the UE 52 with one or more UBDTP rules for respectively, any location within the network and/or time and/or time period. For each UBDTP rule, if location information element is provided, the UBDTP rule may be used only for the location(s) described by the location information element. If no location information element is provided, the UBDTP rule may be applied irrespective of the location of the UE 52. Similarly, for each UBDTP rule, if time information element is provided, the UBDTP rule may be used only for the time(s) described by the time information element. If no time information element is provided, the UBDTP rule may be applied irrespective of the time the UE 52 sends background data.

In some non-limiting examples, the PCF 201 may include one or more indications as to whether or not the location information element and/or the time information element contained in one or more policy rules will or will not be strictly enforced. If the indication(s) stipulate that the location information element and/or the time information element will be strictly enforced, the UE 52 will not be allowed to use the background data transfer service for packets of PDU session(s) and/or QoS flow(s) that do not satisfy the location information element and/or the time information element. If the indication(s) stipulate that the location information element and/or the time information element will not be strictly enforced, the UE 52 may choose to send, instead of dropping, packets of PDU session(s) and/or QoS flow(s) that do not satisfy the location information element and/or the time information element, to have the 5G system apply a different charging policy and/or QoS policy to the traffic that does not satisfy the location information element and/or the time information element.

In some examples, the PCF 201 includes the location element and/or the time element as an information element within the UBDTP. The location information element and/or the time information element are sent to the UE 52 as part of one or more of the rules defined incorporating these information elements.

Each UBDTP rule contains a traffic descriptor that determines under what traffic conditions the UBDTP will be applied, which in some non-limiting examples, may have a similar form and content as the traffic descriptor described above in the context of the URSP. The traffic descriptor works in conjunction with either or both of the location information element and/or time information element so that traffic that satisfies the traffic descriptor may be sent to the network only when the UE 52 is in a location and/or a time period that respectively satisfies the location information element and/or the time information element. Otherwise, even though a packet satisfies the traffic descriptor, the UE 52 may drop it.

In some examples, a UBDTP rule with a "match all" traffic descriptor may be provided. Such a UBDTP rule may be used to route traffic of background data applications that do not match any other more-specific UBDTP rule. As such, it will typically be assigned the lowest available route precedence value.

As discussed above, each URSP rule contains a list of route selection descriptors. In some examples, the URSP rule structure does not define how the PCF 201 splits the URSP when it will not be delivered to the UE 52 in a single NAS message.

If the CN rejects a PDU session establishment request from the UE 52, the UE 52 may trigger a new PDU session establishment based upon the reason for the rejection and the UBDTP.

The traffic descriptor in the USRP and/or UBDTP, as the case may be, ensures that the UE 52 uses an appropriate network slice instance to send background data to a preconfigured AS. In this manner, the likelihood that the UE 52 would abuse the UBDTP to send non-background data is significantly reduced. Further, this mechanism permits the upload of background data to be potentially charged at a lower rate and/or better QoS, such as at a higher maximum bit rate.

UBDTP AS Configuration Phase

In the UBDTP AS configuration phase, the PCF 201 is provided with information that identifies the AS associated with the UE(s) 52 receiving UBDTP service, as identified in the UBDTP identification phase.

The associated AS is identified by AS information that may, in some non-limiting examples, comprise an AF-service-identifier, an external application identifier, an application identifier, the DNN, an external group ID, a PFD, an IP and/or Ethernet descriptor and/or a data network access identifier (DNAI).

In some examples, if the PCF 201 is provided with an external application identifier, the PCF 201 may map this to an application identifier that is used by UPFs 86 and/or CPFs, including without limitation, the PCF 201 and/or SMF 92. In some examples, the PFD may be identified by a PFD identifier that may, in some non-limiting examples, be unique in the scope of a particular application identifier. There may be different PFD types associated with a given application identifier. In some examples, the PFD may comprise, by way of non-limiting examples, a PDF identifier, an IP 3-tuple, including without limitation, a protocol, server side IP address and/or port number, a portion of the URL to be matched, which in some non-limiting examples may be a host name, or a domain matching criterion. Where an IP 3-tuple is specified in a PFD, the PCF 201 may be used to create AS information. In some on-limiting examples, the PFD may be designed to convey a proprietary extension for a proprietary application traffic detection mechanism agreed-upon by the AF 104 and the MNO.

In some examples, the IP descriptor may comprise one or more IP 3 tuple(s), which in some non-limiting examples, may comprise one or more of a source and/or destination IP address, an IPv6 network prefix, source and/or destination port number(s), a protocol ID of the protocol above the IP level, a next header type, a type of service (TOS) (IPv4) and/or traffic class (IPv6) and/or mask, a flow label (IPv6), a security parameter index and/or a packet filter direction.

In some examples, the Ethernet descriptor may comprise one or more of a destination MAC address, an Ethertype as defined in IEEE standard 802.3 (which in some non-limiting examples, may indicate an IPv4/IPv6 payload), a customer-VLAN tag (C-TAG) and/or service-VLAN tag (S-TAG), priority code point (PCP)/drop eligible indicator (DEI) field as defined in IEEE standard 802.1Q and/or IP 3-tuple(s), which in some non-limiting examples, may comprise a destination IP address, an IPv6 network prefix, a destination port number and/or a protocol ID for the protocol above the IP level.

In some examples, the PCF 201 is provided with one or more DNAIs. One DNAI is used to indicate a traffic routing profile for data routing between the UPF 86 and the AS. The traffic routing profile may be considered in the SMF 92 and/or the PCF 201. In some examples, the PCF 201 may use the DNAI to get AS information, including without limitation, the IP descriptor and/or Ethernet descriptor.

In some examples, the AS information may be configured by the OAM. In some examples, an AS provider (ASP) may send the AS information to the CN for UBDTP purposes by means of the signal flow diagram of FIG. 4, subject to the following clarifications:

In some examples, the AF 104 may send the AS information to the NEF 96 as part of the Nnef_BDTPNegotiation_Create request, such as is disclosed in at least 3GPP TS 23.502, and in particular, clause 5.2.6.6.2 thereof and/or Nnef_BDTPNegotiation_Update request, such as is disclosed in at least 3GPP TS 23.502, and in particular, clause 5.2.6.3.3 thereof, service operation. In some non-limiting examples, if the AS information includes an external group ID, the NEF 96 may replace it with an internal group ID. If the AS information includes an external application identifier, the NEF 96 may map this to an application identifier that is used by UPFs 86 and/or CPFs, including without limitation, the PCF 201 and/or SMF 92.

Step 9. In some examples, upon receipt of the AS information as part of the Nnef_BDTPNegotiation_Create request and/or Nnef_BDTPNegotiation_Update request service operation, the NEF 96 may send the AS information to the H-PCF 402 as part of the Npcf_BDTPPolicyControl_Create request and/or Nnef_BDTPolicyControl_Update request service operation. In some non-limiting examples, if the AS information includes an external group ID, the NEF 96 may replace it with an internal group ID. If the AS information includes an external application identifier, the H-PCF 402 may map this to an application identifier that is used by UPFs 86 and/or CPFs, including without limitation, the PCF 201 and/or SMF 92.

In some examples, in step 5 of FIG. 4 the H-PCF 402 may make one or more UBDTP decisions, based on information provided by the AF 104 and/or other available information. If the AF 104 provides AS information, the H-PCF 402 may use this information to create a traffic descriptor, which in some non-limiting examples may include an application ID and/or an IP (or non-IP) descriptor for UBDTP and/or URSP (for background data transfer) service operations. In some examples, if the H-PCF 402 is provided with an external application identifier, the H-PCF 402 may map this to an application identifier that is used by UPFs 86 and/or CPFs, including without limitation, the PCF 201 and/or SMF 92.

Accordingly, the AF 104 may provide AS information to the mobile network for UBDTP purposes. In this manner, the likelihood that the UE 52 would abuse the UBDTP to send non-background data is significantly reduced since the UE 52 would comply with the AS information specified.

UBDTP Operation Phase

In the UBDTP operation phase, the UE(s) 52 identified in the UBDTP identification phase register with the CN and begin to make use of the background data transfer service under the UBDTP.

When the UE 52 performs a UE registration procedure, the AMF 90 retrieves the access and mobility subscription data from the UDM 102 including, without limitation, by a Nudm_SDM_Get service operation, such as is disclosed at least in 3GPP TS 23.502, and in particular, clause 5.2.3.3.2 thereof. In some examples, the UDM 102 may obtain the UE subscription data from the UDR 401, including without limitation, an indication that the UE is allowed to UBDTP service. In turn, the UDM 102 provides the indication to the AMF 90.

In some examples, the AMF 90 may request the PCF 201 to UE-related policies, including without limitation, using a policy association establishment procedure, such as is disclosed at least in 3GPP TS 23.502 and in particular, clause 4.16.1.2 thereof. If the access and mobility subscription data includes this indication, the AMF 90 forwards this indication, or a related indication having a similar meaning to the PCF 201.

In some examples, the PCF 201 may have been configured with an indication that the UE 52 belongs to an internal group, is accessing an NSI represented by an S-NSSAI and/or accessing a DNN and/or a UE ID (including without limitation, a GPSI, permanent equipment identifier (PEI) and/or SUPI), that allows the UE 52 to UBDTP service.

If the UE 52 is confirmed as being entitled to UBDTP service, in some non-limiting examples, the PCF 201 may send the UBDTP (or URSP for background data transfer purposes) to the AMF 90. The AMF 90 may then include this UBDTP (or URSP) in the acceptance of the registration that it sends to the UE 52. Alternatively, in some non-limiting examples, the AMF 90 may include the UBDTP (or URSP) in a UE configuration update procedure for transparent UE policy delivery to the UE 52, such as is disclosed at least in 3GPP TS 23.502 and in particular clause 4.2.4.3 thereof.

The AF 104 may request the CN to allow the UE 52 to have UBDTP service by using the Nnef_BDTPNegotiation_Create (as shown in step 1 of FIG. 4) and/or Nnef_BDTP-Negotiation_Update (as shown in step 8 of FIG. 4) service operations of the NEF 96, such as is disclosed at least in 3GPP TS 23.502 and in particular, clause 4.16.7 thereof. The AF 104 may include an indication allowing the UE 52 to have UBDTP service in such service operations, as well as information identifying the affected UE(s) 52. The information identifying the affected UE(s) 52 may in some non-limiting examples, comprise one or more of an AF-service identifier, an external group ID, NSI represented by an S-NSSAI, a DNN, a UE ID (including without limitation, one or more of a GPSI, PEI, SUPI and/or external UE ID) and/or an external application identifier.

In some examples, the NEF 96 may map an external ID to an internal ID, including without limitation, a GPSI to a SUPI, an external group ID to an internal group ID and/or an external application identifier to an application identifier.

The NEF 96 may process the request by the AF 104 to allow the UE 52 to have UBDTP service by using the Npcf_BDTPolicyControl_Create (as shown in step 2 of FIG. 4) and/or Npcf_BDTPolicyControl_Update (as shown in step 9 of FIG. 4) service operations of the PCF 201 to update an existing UBDTP.

The PCF 201 creates and/or updates one or more new UBDTP (and/or URSP for background data transfer purposes) rule(s) for background data transfer by those UEs 52 identified by the AF 104 as shown in step 5 of FIG. 4.

In some examples, the PCF 201 may provide the UBDTP (and/or USRP) rule(s) to the authorized UE(s) 52 by a UE configuration update procedure for transparent UE policy delivery, such as is disclosed at least in 3GPP TS 23.502 and in particular, clause 4.2.4.3 thereof. In some examples, the PCF 201 may map an external ID to an internal ID, including without limitation, a generic public subscription identifier (GPSI) to a subscription permanent identifier (SUPI), an external group ID to an internal group ID and/or an external application identifier to an application identifier.

In some non-limiting examples, the UBDTP may include a URSP that specifies one or more URSP rule(s) that the UE 52 would follow when requesting establishment of a PDU session for transferring background data. Alternatively, in some non-limiting examples, the PCF 201 may create a URSP that may be used for background data transfer. Such URSP may include one or more of an application identifier allocated to background data transfer, a DNN having an associated AS for receiving background data transfer and/or an IP or non-IP descriptor that indicates the information of the AS for receiving background data transfer (which, in some non-limiting examples, may comprise an IP address, a UDP and/or a TCP port).

The CN may detect background data transfer through a number of mechanisms.

In a first mechanism, the UE 52 sends a service request to the AMF 90 indicating background data transfer when it requests a PDU session in a manner similar to the UE-requested PDU session establishment procedures disclosed at least in 3GPP TS 23.502 and in particular, clause 4.3.2.2.1 thereof for non-roaming scenarios and/or roaming scenarios with local breakout and/or clause 4.3.2.2.2 thereof for home-routed roaming scenarios, subject to the clarification that when the UE 52 requests a PDU session in step 1 of clause 4.3.2.2.1 and/or step 1 of clause 4.3.2.2., the UE 52 may indicate "Background Data Transfer Service" as the request type in the N1 NAS message to the AMF 90.

In some examples, the AMF 90 may have already obtained the access and mobility policy associated with the UE 52 during the registration procedure for the UE 52.

If the access and mobility policy does not contain an indicator allowing the UE 52 UBDTP service, the AMF 90 may reject the UE 52 request. Alternatively, if the access and mobility policy contains an indicator allowing the UE 52 UBDTP service, but the UBDTP (and/or URSP) rule contains a location information element and/or time information element that is not satisfied, the AMF 90 may reject the UE 52 request. In either case, for example, steps 2 through 12 of clause 4.3.2.2.1 and/or steps 2 through 14 of clause 4.3.2.2.2 may be omitted. Rather, the AMF 90 may send a reject message to the UE 52 in the NAS message to the RAN 84 discussed in step 12 of clause 4.3.2.2.1, which the RAN 84 forwards to the UE 52 in step 13 of clause 4.3.2.2.1.

Otherwise, if the access and mobility policy contains an indicator allowing the UE 52 UBDTP service and the UBDTP (and/or URSP) rule does not contain any location information element and/or time information element or contains location information element and/or time information element that are satisfied, the AMF 90 stores the PDU session ID and background data transfer service for this PDU session ID in the UE context and, for example in step 3 of clause 4.3.2.2.1 and/or step 3 of clause 4.3.2.2.2, the AMF 90 may select an SMF 92 that is in charge of establishing a PDU session for carrying the background data transfer service and indicates "Background Data Transfer Service" as the request type in the message to the SMF 92.

Depending upon the applicable UBDTP (and/or URSP) rule associated with the background data transfer service, the AMF 90 may include location information element and/or time information element associated with at least one or more of the DNN, S-NSSAI(s), access type, RAT type and/or SSC mode.

In a second mechanism, the UE 52 sends a service request to the AMF 90 when it requests a PDU session in a manner similar to the UE-requested PDU session establishment procedures disclosed at least in 3GPP TS 23.502 and in particular, clause 4.3.2.2.1 thereof for non-roaming scenarios and/or roaming scenarios with local breakout and/or clause 4.3.2.2.2 thereof for home-routed roaming scenarios, subject to the qualification that the UE 52 does not inform the AMF 90 that the requested PDU session is for a background data transfer. Rather, the UE 52 requests the SMF 92 to establish the requested PDU session for background data transfer, for example by sending to the AMF 90 in step 1 of clause 4.3.2.2.1 and/or step 1 of clause 4.3.2.2.2 an N1 SM container that indicates "Background Data Transfer Service". In step 3 of clause 4.3.2.2.1 and/or step 3 of clause 4.3.2.2.2, the AMF 90 forwards the N1 SM container to the selected SMF 92.

Upon receipt of the request, the SMF 92 checks with the UDM 102 and/or with the PCF 201 to determine whether the UE 52 is entitled to UBDTP service. In response, the UDM 102 may send, for example, in step 4 of clause 4.3.2.2.1 and/or step 7 of clause 4.3.2.2.2, an indication whether the UE 52 is entitled to UBDTP service.

If the UE 52 is not entitled to UBDTP service, steps 5 through 10 of clause 4.3.2.2.1 and/or steps 8 through 13 of clause 4.3.2.2.2 may be omitted.

If the UE 52 is entitled to UBDTP service, the SMF 92 may, in some non-limiting examples, provide an indication to this effect to the PCF 201, for example in steps 7b of clause 4.3.2.2.1 and/or step 9b of clause 4.3.2.2.2. In response, the PCF 201 may send to the SMF 92 the PCC rules that include information on how to handle UBDTP service for the PDU session. In some non-limiting examples, this may include location information element and/or time information element associated with at least one or more of the DNN, S-NSSAI(s), access type, RAT type, SSC mode and/or the charging policy that may indicate, by way of non-limiting examples, the maximum data volume for the PDU session.

If either or both of the UDM 102 and/or the PCF 201 indicate that the UE 52 is not entitled to UBDTP service, the SMF 92 may reject the UE 52 request. Alternatively, if either or both the UDM 102 and the PCF 201 indicate that the UE 52 is entitled to UBDTP service, but the UBDTP (and/or URSP) rule contains a location information element and/or time information element that is not satisfied, the SMF 92 may reject the UE 52 request. In either case, for example, steps 8 through 10 of clause 4.3.2.2.1 and/or steps 2 through 14 of clause 4.3.2.2.2 may be omitted. Rather, the SMF 92 may send a reject message to the UE 52 in the N1 SM container to the AMF 90, for example discussed in step 11 of clause 4.3.2.2.1 and/or step 14 of clause 4.3.2.2.2, that includes a cause, indicating the reason that the UE 52 is not entitled to UBDTP service (including, without limitation that the UE 52 is not entitled to UBDTP service, that the current UE 52 location does not satisfy a location information element constraint and/or that the current UE 52 time does not satisfy a time information element constraint).

The AMF 90 forwards the N1 SM container to the RAN 84 in step 12 of clause 4.3.2.2.1. The RAN 84 forwards the N1 SM container to the UE 52 in step 13 of clause 4.3.2.2.1.

If the UE 52 is entitled to UBDTP service, the SMF 92 establishes the requested PDU session for background data transfer and may, in some non-limiting examples, so advise the AMF 90 by sending an indication to this effect, associated with the PDU session, to the RAN 84 in an N2 SM information message to the AMF 90, for example as discussed in step 11 of clause 4.3.2.2.1 and/or step 14 of clause 4.3.2.2.2. If so, the AMF 90 may store an indication to this effect for the PDU session. In some non-limiting examples, the AMF 90 may refer to the UBDTP (and/or URSP) policy for any prevailing location information element and/or time information element constraints. In some non-limiting examples, the N2 SM information message may include one or more time information element for the PDU session during which it may employ background data transfer.

Once the PDU session for background data transfer has been established, if the time of the UE 52 satisfies one or more time information element for the PDU session, the RAN 84 may allow UL and/or DL data transmission. However, if the time of the UE 52 does not satisfy any of the time information element for the PDU session, the RAN 84 may not assign radio resources to the PDU session and/or to a QoS flow that is to be used to deliver background data and/or may request the SMF 92 to deactivate the UP of the PDU session established for background data transfer. Alternatively, in some non-limiting examples, the RAN 84 may request the SMF 92 to release the PDU session and/or QoS flow that is used to deliver the background data. If the UE 52 has only one PDU session for background data transfer, the RAN 84 may initiate an AN release procedure, such as is discussed at least in 3GPP TS 23.502 and in particular clause 4.2.6 thereof, by which the UE 52 will enter the CM-IDLE state.

As well, if the UE 52 is entitled to UBDTP service and all location information element and/or time information element constraints are satisfied such that the requested PDU session for background data transfer has been established, the SMF 92 may send to the UPF 86 an indication that the PDU session is for background data transfer and in some non-limiting examples, may include time information element for the PDU session and/or a QoS flow that is to be used to deliver background data. If the time of the UE 52 satisfies one or more time information element for the PDU session set out in the time information element provided by the SMF 92 to the UPF 86, the UPF 86 may allow UL and/or DL data transmission. However, if the time of the UE 52 does not satisfy any of the time information element for the PDU session set out in the time information element provided by the SMF 92 to the UPF 86, the UPF 86 may drop any UL PDU, may not notify the SMF 92 of the DL PDU and/or may notify the SMF 92 that the time information element constraints have expired and/or that the data volume limit has been reached, so that the SMF 92 may deactivate the UP of the PDU session established for background data transfer, such as is discussed at least in 3GPP TS 23.502 and in particular, clause 4.3.7 thereof and/or the SMF 92 may release the PDU session established for background data transfer, such as is discussed at least in 3GPP TS 23.502, and in particular, clause 4.3.4 thereof.

When the UE 52 sends a service request to enter the CM-CONNECTED state, it may initiate a UE-triggered service request procedure, such as is discussed at least in 3GPP TS 23.502 and in particular, clause 4.3.3.2 thereof.

In step 1 of clause 4.3.3.2, the UE 52 may include an indication that it intends to use the UBDTP service. The AMF 90 may check the location information element and/or time information element associated with a UBDTP (and/or URSP) rule associated with background data transfer to determine if the UE 52 is entitled to UBDTP service. If not, or if the UE 52 is entitled to UBDTP service but at least one of the location information element and/or time information element constraints is not satisfied, the AMF 90 may deny the service request.

Alternatively, for example in step 1 of clause 4.3.3.2, the UE 52 may include in the service request message to the AMF 90 a list of PDU sessions to be activated, at least one of which may be the PDU session previously established for background data transfer. The AMF 90 may in such scenario be aware of the PDU session that has been previously established for background data transfer, or if not, process each of the PDU sessions in the list. In so doing, the AMF 90 may check the location information element and/or time information element associated with a UBDTP (and/or URSP) rule associated with background data transfer (or generally) to determine if the UE 52 is entitled to UBDTP service (or generally, to proceed with service operations).

If the UE 52 is not entitled to UBDTP service (or generally, to proceed with service operations), or if the UE 52 is entitled to UBDTP service (or generally, to proceed with service operations) but at least one of the location information element and/or time information element constraints is not satisfied, the AMF 90 may deny the service request.

Such denial of the service request may be in the form of an MM NAS message sent by the AMF 90, for example in step 12 of clause 4.3.3.2, that includes the PDU session status in the AMF 90. The MM NAS message may include the PDU session ID that has been rejected by the AMF 90 and/or indicate the cause, indicating the reason that the UE 52 is not entitled to UBDTP service (including, without limitation that the UE 52 is not entitled to UBDTP service, that the current UE 52 location does not satisfy a location information element constraint and/or that the current UE 52 time does not satisfy a time information element constraint).

If the UE 52 is entitled to UBDTP service (or generally, to proceed with service operations) and the location information element and/or time information element constraints are satisfied, the AMF 90 may request the SMF 92 to activate the UP connection, for example in step 4 of clause 4.3.3.2. In so doing, the SMF 92 may check the location information element and/or time information element for the PDU session associated with background data transfer (or generally) to determine if the UE 52 is entitled to UBDTP service (or generally, to proceed with service operations).

If the UE 52 is not entitled to UBDTP service (or generally, to proceed with service operations), or if the UE 52 is entitled to UBDTP service (or generally, to proceed with service operations) but at least one of the location information element and/or time information element constraints is not satisfied, the SMF 92 may send a reject message to the AMF 90, for example in step 11 of clause 4.3.3.2, with a cause, indicating the reason that the UE 52 is not entitled to UBDTP service (including, without limitation that the UE 52 is not entitled to UBDTP service, that the current UE 52 location does not satisfy a location information element constraint and/or that the current UE 52 time does not satisfy a time information element constraint). Thereafter, for example in step 12 of clause 4.3.3.2, the AMF 90 sends an MM NAS message that includes the PDU session status in the AMF 90. The MM NAS message may include the PDU session ID that has been rejected by the AMF 90 and/or indicate the cause, indicating the reason that the UE 52 is not entitled to UBDTP service (including, without limitation that the UE 52 is not entitled to UBDTP service, that the current UE 52 location does not satisfy a location information element constraint and/or that the current UE 52 time does not satisfy a time information element constraint) sent by the SMF 92 to the AMF 90.

If the UE 52 is entitled to UBDTP service (or generally, to proceed with service operations) and the location information element and/or time information element constraints are satisfied, the SMF 92 monitors the location information element and/or the time information element specified for the PDU session established for background data transfer. If at any time, at least one of the location information element and/or time information element constraints is not satisfied, such as, by way of non-limiting example, due to mobility and/or handover of the UE 52, the SMF 92 may:

initiate a PDU session release procedure such as is described in at least 3GPP TS 23.502 and in particular clause 4.3.4.2 (UE 52 or network requested PDU session release for non-roaming and roaming with local breakout) and/or clause 4.3.4.3 (UE 52 or network requested PDU session release for home-routed roaming) thereof. The SMF 92 may release the PDU session associated with background data transfer based on the request of the UE 52, the AMF 90 (due to a violation of a location information element and/or time information element constraint), PCF 201 (due to a violation of a location information element and/or time information element constraint) and/or a decision by the SMF 92 to release the PDU session (due to a violation of a location information element and/or time information element constraint); or initiate a UP deactivation such as is described in at least 3GPP TS 23.502 and in particular clause 4.3.7 (CN-initiated selected deactivation of UP connection of an existing PDU session) thereof.

ATSSS Policy

In some examples, the PCF 201 includes the location element and/or the time element as an information element with the ATSSS policy. The location element and/or time information element are sent to the UE 52 as part of one or more of the rules defined incorporating these information elements. The UE 52 may thus apply different ATSSS policies at different locations and/or at different times, which allows for greater flexibility and a tailored ATSSS policy.

In some non-limiting examples, the PCF 201 may include one or more indications, including without limitation, an enforcement indication, that stipulates whether or not the location information element and/or the time information element will or will not be strictly enforced.

In some non-limiting examples, the PCF 201 may inform the SMF 92 of the applicable indication(s) for the location information element and/or the time information element of individual policy rules. In turn, in some non-limiting examples, the SMF 92 may forward the indication(s) to the UPF 86 and/or to the RAN 84.

In some non-limiting examples, the PCF 201 may include the applicable indication(s) for the location information element and/or the time information element of individual policy rules in the ATSSS policy.

If the indication(s) stipulate that the location information element and/or the time information element will be strictly enforced, one or more of the UE 52, the UPF 86 and/or the RAN 84 may drop packets of PDU session(s) and/or QoS flow(s) that do not satisfy the location information element and/or the time information element.

If the indication(s) stipulate that the location information element and/or the time information element will not be strictly enforced, one or more of the UE 52, the UPF 86 and/or the RAN 84 may choose to send, instead of dropping, packets of PDU session(s) and/or QoS flow(s) that do not satisfy the location information element and/or the time information element. The charging system may apply a different charging policy to the PDU session(s) and/or QoS flow(s) that do not satisfy the location information element and/or the time information element. The SMF may provide different QoS parameters to the UE 52, RAN 84 and/or UPF 86 for the PDU session(s) and/or QoS flow(s) that do not satisfy the location information element and/or the time information element.

In some examples, the PCF 201 sends ATSSS policy rule(s) to the SMF 92 during the PDU session establishment procedure. In some examples, the SMF 92 may send the ATSSS policy rule(s) to the UE 52 in a non-access stratum (NAS) message along an N1 interface. In some examples, the SMF 92 may send the ATSSS policy rule(s) to the UE 52 as part of a QoS rule.

In some examples, the ATSSS policy rule(s) may apply to DL traffic. In such examples, the PCF 201 may send DL ATSSS policy rule(s) to the SMF 92 during a PDU session establishment procedure or on an ongoing basis for an established PDU session. In some examples, the SMF 92 may use the DL ATSSS policy rule(s) to establish a DL connection from the UPF 86 to RAN node 84($s$) associated with the UE 52. Such DL ATSSS policy rule(s) may contain location information element and/or time information element in respective location information element and/or time information element that allow the SMF 92 to select a RAN node 84 in accordance therewith.

In some examples, the SMF 92 may send the DL ATSSS policy rule(s) to the UPF 86 including the location information element and/or time information element that allow the UPF 86 to forward DL PDUs to suitable RAN nodes 84 in accordance with the location information element and/or time information element.

QoS Policy

The QoS Policy has been described at least in 3GPP TS 23.501 and in particular, clause 5.7 thereof.

In some examples, the when the PDU session is established or modified, the SMF 92 may send one or more QoS profiles for one or more QoS flows to that the RAN 84 may select a QoS profile that satisfies the location information element and/or time information element specified therein.

In some examples, the QoS profiles may overlap other QoS profiles in terms of either or both of the location information element and/or time information element. If a plurality of QoS profiles overlap in terms of time information element, the RAN 84 may select any one of the overlapping QoS profiles based on the current traffic load condition in the RAN node 84. If a plurality of QoS profiles overlap in terms of location information element, the RAN 84 may select any one of the overlapping QoS profiles based on the current traffic load condition in the RAN node 84, as well as the available resources of the RAN node 84 and/or information on the mobility of the UE 52 and advise the SMF 92 of the selected QoS profile using an N2 SM message.

Having selected one of the overlapping QoS profiles, the RAN 84 may send an RRC signaling message to the UE 52 to notify it of the selected QoS parameters.

In some examples, the SMF 92 may send a PDU session modification request message to the UPF 86 to provide it with the selected QoS information.

In some examples, the SMF 92 sends one or more QoS rules associated with a QoS flow to the UE 52 when the PDU session is established or modified, so that the UE 52 may select a suitable QoS profile. In some examples, the SMF 92 sends one or more default QoS rules to the UE 52. In some examples, the SMF 92 sends the location element and/or the time element as part of one or more of the QoS rules. The UE 52 may thus apply different QoS rules at different locations and/or at different times, which allows for greater flexibility and a tailored QoS policy.

In some examples, the QoS rules may overlap other QoS rules (which in some examples may be default QoS rules) in terms of either or both of the location information element and/or the time information element. If a plurality of QoS (default) rules overlap in terms of either or both of the location information element and/or the time information element, the UE 52 may select any one of the overlapping (default) QoS rules based on QoS parameters and the resource assignment information the UE 52 receives from the serving RAN node 84, which, in some examples, may be selected QoS parameters sent by the RAN 84 in the RRC message discussed above.

In some examples, the SMF 92 may provide QoS-related information as sets to the UPF 86. In some examples, the SMF 92 sends the location information element and/or the time information element as part of one or more QoS-related information sets. The UPF 86 may thus apply different QoS-related information sets at different locations and/or at different times, to select corresponding QoS parameters, including without limitation, session-aggregated maximum bit rate (Session-AMBR), GFBR, MFBR and/or packet delay budgets for RAN 84 and for UPF 86, maximum data burst volume.

In some examples, the QoS-related information sets may overlap other QoS-related information sets in terms of either or both of the location information element and/or the time information element. If a plurality of QoS-related information sets overlap in terms of either or both of the location information element and/or the time information element, the UPF 86 may select any one of the overlapping QoS-related information sets based on the traffic condition and/or the resources available to the UPF 86.

Having selected one of the overlapping QoS-related information sets, the UPF 86 may send a message to the SMF 92 to notify it of the selected QoS-related information set. The SMF 92 may then select a QoS profile and/or QoS rule for the QoS flow as a result and may notify the RAN 84 and/or the UE 52 of the selected QoS profile and/or QoS rule using the PDF session modification procedure.

With the introduction of the location element and/or time element as parameters upon which one or more QoS profiles, QoS rules and/or QoS-related information sets may be conditioned, the SMF 92 may assign multiple QoS profiles to the RAN 84, multiple QoS rules to the UE 52 and QoS-related information sets to the UPF 86. This allows the UE 52, UPF 86 and/or RAN 84, as the case may be, to select a suitable QoS profile based on the traffic load, the condition of the wireless channel of the UE 52 and of other UEs 52, the resources of the RAN node 84 that are available and/or the condition of the CN, without addition instruction from the SMF 92. In particular, use of the location element and/or time element in this manner tends to reduce the amount of CP 306 signaling to the UE 52 when the CN is congested. This may especially be the case when the UE 52 is a device such as an internet of things (IoT) device and/or UEs 52 in vehicles, which may be characterized by having PDU sessions that last for a very long time (even to the point of never being released until the UE 52 is de-registered).

Further, the RAN 84 and/or UPF 86 may use corresponding QoS parameters for traffic enforcement and/or to detect abnormal behaviour by the UE 52.

In addition to the foregoing, the UE 52 may know the QoS availability at various locations and/or various times. In some examples, the UE 52 may have a user interface and/or application software configured to display QoS parameters to a user of the UE 52, which allows the user to invoke one or more applications that correspond to the QoS parameters provided by the CN, as shown in the following of non-limiting example scenarios:

The user may choose to only use a video streaming application that involves high data rates, when it is known to the user that the network can support such high data rates;

The user may choose to use a video streaming application that can select a video data rate that corresponds to known QoS parameters, including without limitation, MFBR, Session-AMBF and/or UE Aggregate Maximum Bit Rate (UE-AMBR);

Some devices, including without limitation, IoT devices and/or UEs 52 in vehicles may send UL data when the network can offer higher data rates, or is less congested.

Access and Mobility Management

In some examples, the PCF 201 sends access and mobility-related policy control information to the AMF 90 to enable enforcement of access and mobility policy decision made by the PCF 201 for control of service area restrictions and RAT/frequency selection policy (RFSP) index. The access and mobility-related policy has been described at least in 3GPP TS 23.503 and in particular clause 6.5 thereof.

Since the UE 52 may exhibit different mobility patterns at different location and/or times, such as, by way of non-limiting example, during weekdays, weekends, evenings and at night, the access and mobility management parameters may be conditioned on one or more of location information element and/or time information element and sent to the UE 52 so that suitable parameters that satisfy conditions set out in the location information element and/or the time information element may be selected by the UE 52.

These parameters employ TAIs that indicate where the UE 52 is allowed (or is not allowed, as the case may be) to be registered. It will thus be appreciated that, to a certain extent, location information element is already taken into account by the TAIs in establishing access and mobility management parameters. Accordingly, the discussion below will focus primarily on the time information element.

The access and mobility-related policy control information comprises a list of allowed TAIs and a list of non-allowed TAIs.

In some examples, each (or in some examples, all) allowed TAI(s) may be associated with time information element that determines the time period(s) to apply the allowed TAI(s). For each (or all, as the case may be) allowed TAI(s), if time information element is provided, the (or all, as the case may be) allowed TAI(s) will be enforced only for the time(s) described by the time information element. If no time information element is provided, the (or all, as the case may be) allowed TAI(s) will be applied irrespective of the time of the UE 52.

In some examples, each (or in some examples, all) non-allowed TAI(s) may be associated with time information element that determines the time period(s) to apply the non-allowed TAI(s). For each (or all, as the case may be) non-allowed TAI(s), if time information element is provided, the (or all, as the case may be) non-allowed TAI(s) will be enforced only for the time(s) described by the tie information. If no time information element is provided, the (or all, as the case may be) non-allowed TAI(s) will be applied irrespective of the time of the UE 52.

The MNO may make use of the time information element for each (or in some examples, all) allowed TAI(s). By way of non-limiting example, the expected behaviour of a UE 52 may be to send UL data at a scheduled time, such as, without limitation, between midnight and 2:00 am on Sundays. If one or more allowed TAIs contains time information element limited to this period, the UE 52 will be precluded from sending and/or receiving data outside this period, thus reducing the risk of unauthorized access to the network by a third party. Further, the RAN 84 may detect behaviour that is contrary to the time information element and use this to detect malicious behaviour that it can report to a CPF including, without limitation, the AMF 90, SMF 92 and/or PCF 201. In some non-limiting examples, the CPF may report detected malicious behaviour to the AF 104 that is used by the AS provided to interact with the mobile network.

In some examples, the PCF 201 may provide multiple RFSP indices in the access and mobility policy for radio resource management purposes. In some examples such RFSP indices may be associated with time information element that determines the time period(s) to apply the RFSP index. For each RFSP index, if time information element is provided, the RFSP index will be enforced only for the time(s) described by the time information element. If no time information element is provided, the RFSP index will be applied irrespective of the time of the UE 52.

With the introduction of the location element and/or time element as parameters upon which one or more access and mobility management policy rules may be conditioned, the PCF 201 may define a flexible access and mobility management policy. By way of non-limiting example:

The registration area and/or tracking area may be limited at different times, reducing signaling to page the UE 52 when an incoming call arrives;

Unauthorized calls and/or data connections may be precluded by specifying at what locations and/or times the UE 52 may access the network.

Spending Policy

In some examples, the UE 52 may primarily remain in a given location for a large period of time. By way of non-limiting example, a UE 52 may primarily remain in an office building during weekdays but may primarily remain in a suburban or rural residential area during weekends and/or evenings.

In such examples, the NWDAF could identify the location(s) and/or time(s) during which the UE 52 may most predominantly send or receive data and provide this information to the PCF 201.

Armed with this information, the PCF 201 may alter a spending policy associated with the UE 52, including, by way of non-limiting example, providing a higher (or lower) data rate, providing a higher (or lower) data usage cap and/or charging a higher (or lower) per MB rate.

Method Actions

Figure 5:
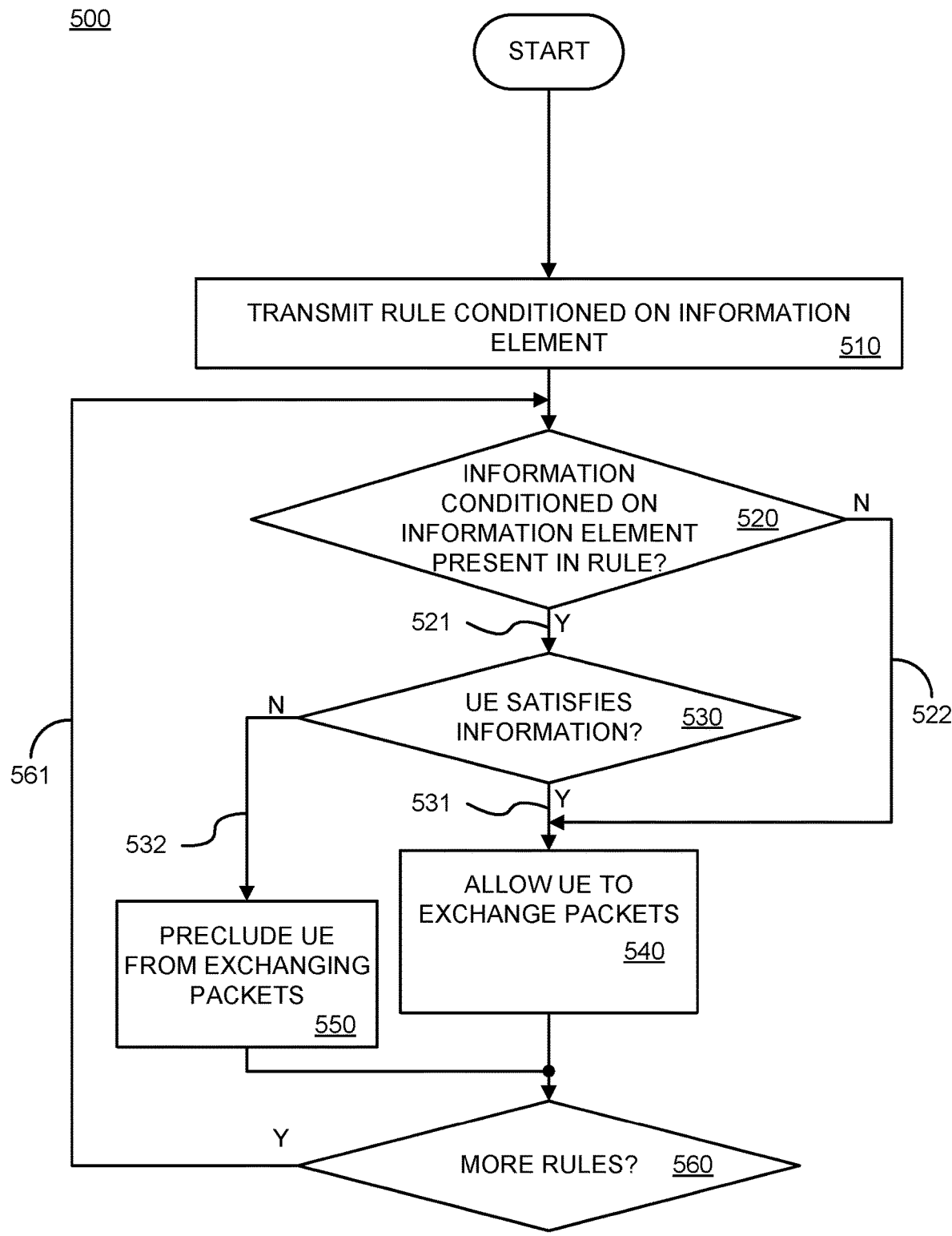
FIG. 5 is a flow chart illustrating an example of a method at an NF for optimizing operation of a UE in a network according to an example.

Turning now to FIG. 5, there is shown a flow chart, shown generally at 500, of example actions taken at an NF for optimizing the operation of a UE in a network.

One example action 510 is to transmit along the network at least one rule of at least one policy that governs how the UE may exchange packets along the network and that contains information conditioned on at least one information element.

Each rule is considered in decision 520. If information conditioned on the information element is present in the rule being considered 521, then processing proceeds to decision 530. If not 522, then processing proceeds to action 540.

The information is considered in decision 530. If the information is satisfied by the UE 531, then processing proceeds to action 540. If not 532, then processing proceeds to action 550.

An example action 540 is to allow the UE to exchange packets in accordance with any constraints contained in the at least one rule.

An example action 550 is to preclude the UE from exchanging packets in accordance with the at least one rule.

The number of rules is considered in decision 560. If more rules should be considered 561, then processing proceeds to decision 520.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method comprising:
determining, by a policy control function (PCF), if at least one of location information and time information conditions associated with a background data transfer is violated;
requesting, by the PCF, a session management function (SMF) to release a protocol data unit (PDU) session associated with the background data transfer if at least one of the location information and the time information conditions associated with the background data transfer is violated; and
releasing, by the SMF, the PDU session associated with the background data transfer.

2. The method according to claim 1, further comprising: acknowledging, by the SMF, the request.

3. The method according to claim 1, further comprising, before releasing the PDU session associated with the background data transfer:
establishing, by the SMF, the PDU session for the background data transfer.

4. The method according to claim 1, wherein the location information condition indicates where the PDU session associated with the background data transfer is allowed for a user equipment (UE).

5. The method according to claim 4, wherein the location information condition includes a list of identifiers, each identifier in the list being associated with a radio access network (RAN) node that sends and receives signals associated with the PDU session.

6. The method according to claim 5, wherein the identifier is one of a cell identifier or an RAN node identifier.

7. The method according to claim 4, wherein the location information includes a list of tracking area identifier (TAI), each TAI identifying a tracking area.

8. The method according to claim 1, wherein the time information condition indicates a time range during which the PDU session associated with the background data transfer is allowed a user equipment (UE).

9. The method according to claim 8, wherein the time information condition includes a start time of the range and an end time of the range.

10. The method according to claim 1, wherein the PCF requests the SMF to release the PDU session by sending a policy indicating the SMF to release the PDU session, wherein the policy further includes an enforcement indication indicating whether or not the at least one of location information and time information conditions will be strictly enforced.

11. The method according to claim 10, wherein the policy is a user equipment (UE) route selection policy (URSP).

12. A communication system comprising a policy control function (PCF) and a session management function (SMF), wherein:
the PCF is configured to:
determine if at least one of location information and time information conditions associated with a background data transfer is violated; and
request the SMF to release a protocol data unit (PDU) session associated with the background data transfer if at least one of the location information and the time information conditions associated with the background data transfer is violated; and
the SMF is configured to:
release the PDU session associated with the background data transfer.

13. The communication system according to claim 12, wherein the SMF is further configured to acknowledge the request.

14. The communication system according to claim 12, wherein the SMF is further configured to: establish the PDU session for the background data transfer.

15. The communication system according to claim 12, wherein the location information condition indicates where the PDU session associated with the background data transfer is allowed for a user equipment (UE).

16. The communication system according to claim 15, wherein the location information condition includes at least one of:
a list of identifiers, each identifier in the list being associated with a radio access network (RAN) node that sends and receives signals associated with the PDU session; and
a list of tracking area identifier (TAI), each TAI identifying a tracking area.

17. The communication system according to claim 12, wherein the time information condition indicates a time range during which the PDU session associated with the background data transfer is allowed for a user equipment (UE).

18. The communication system according to claim 17, wherein the time information condition includes a start time of the range and an end time of the range.

19. The communication system according to claim 12, wherein the PCF is configured to request the SMF to release the PDU session by sending a policy indicating the SMF to release the PDU session, wherein the policy further includes an enforcement indication indicating whether or not the at least one of location information and time information conditions will be strictly enforced.

20. The communication system according to claim 19, wherein the policy is a user equipment (UE) route selection policy (URSP).

* * * * *